US008625173B2

(12) United States Patent
Asada et al.

(10) Patent No.: US 8,625,173 B2
(45) Date of Patent: Jan. 7, 2014

(54) IMAGE RECORDING APPARATUS

(75) Inventors: Tetsuo Asada, Kuwana (JP); Hirotaka Aoki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 219 days.

(21) Appl. No.: 13/183,655

(22) Filed: Jul. 15, 2011

(65) Prior Publication Data

US 2012/0081760 A1 Apr. 5, 2012

(30) Foreign Application Priority Data

Sep. 30, 2010 (JP) ................................ 2010-221279
Sep. 30, 2010 (JP) ................................ 2010-221285

(51) Int. Cl.
*H04N 1/04* (2006.01)

(52) U.S. Cl.
USPC ........... 358/498; 358/496; 358/497; 358/471; 271/3.14; 271/9.08; 399/397

(58) Field of Classification Search
USPC .......... 358/498, 474, 486, 497, 496; 271/270, 271/10.11, 10.13, 114; 399/397
See application file for complete search history.

(56) References Cited

U.S. PATENT DOCUMENTS 5,021,837 A * 6/1991 Uto et al. ...................... 399/405
6,010,124 A * 1/2000 Higashikawa et al. ...... 271/3.02
7,021,355 B2 * 4/2006 Cummins et al. ............. 156/364
7,068,397 B2 * 6/2006 Sugano et al. ................ 358/409
7,116,919 B2 * 10/2006 Ishii ................................ 399/12
7,468,818 B2 * 12/2008 Suzuki .......................... 358/498
7,618,140 B2 * 11/2009 Kato ............................. 347/104
7,688,482 B2 * 3/2010 Iwago ........................... 358/496
7,887,044 B2 * 2/2011 Uchino et al. ................ 271/121
8,208,182 B2 * 6/2012 Han .............................. 358/496
8,340,567 B2 * 12/2012 Katayama ...................... 399/405
2006/0263130 A1 * 11/2006 Shin .............................. 399/405
2008/0007935 A1 1/2008 Kondo et al.
2010/0245515 A1 9/2010 Uchida et al.

FOREIGN PATENT DOCUMENTS

JP 2008-28988 A 2/2008
JP 2009-107179 A 5/2009
JP 2010-047014 A 3/2010
JP 2010-76421 A 4/2010

* cited by examiner

*Primary Examiner* — Negussie Worku
(74) *Attorney, Agent, or Firm* — Scully, Scott, Murphy & Presser, PC

(57) ABSTRACT

An image recording apparatus including: a main frame including (a) a pair of side plates facing each other in one direction and (b) a base plate whose opposite end portions in the one direction are respectively supported by the pair of side plates; a guide member provided at an inside area interposed between a pair of side plates in the one direction, so as to define a conveying path through which a recording medium is conveyed; and a sensor device supported by one of the pair of side plates and configured to sense the recording medium conveyed through the conveying path.

15 Claims, 20 Drawing Sheets

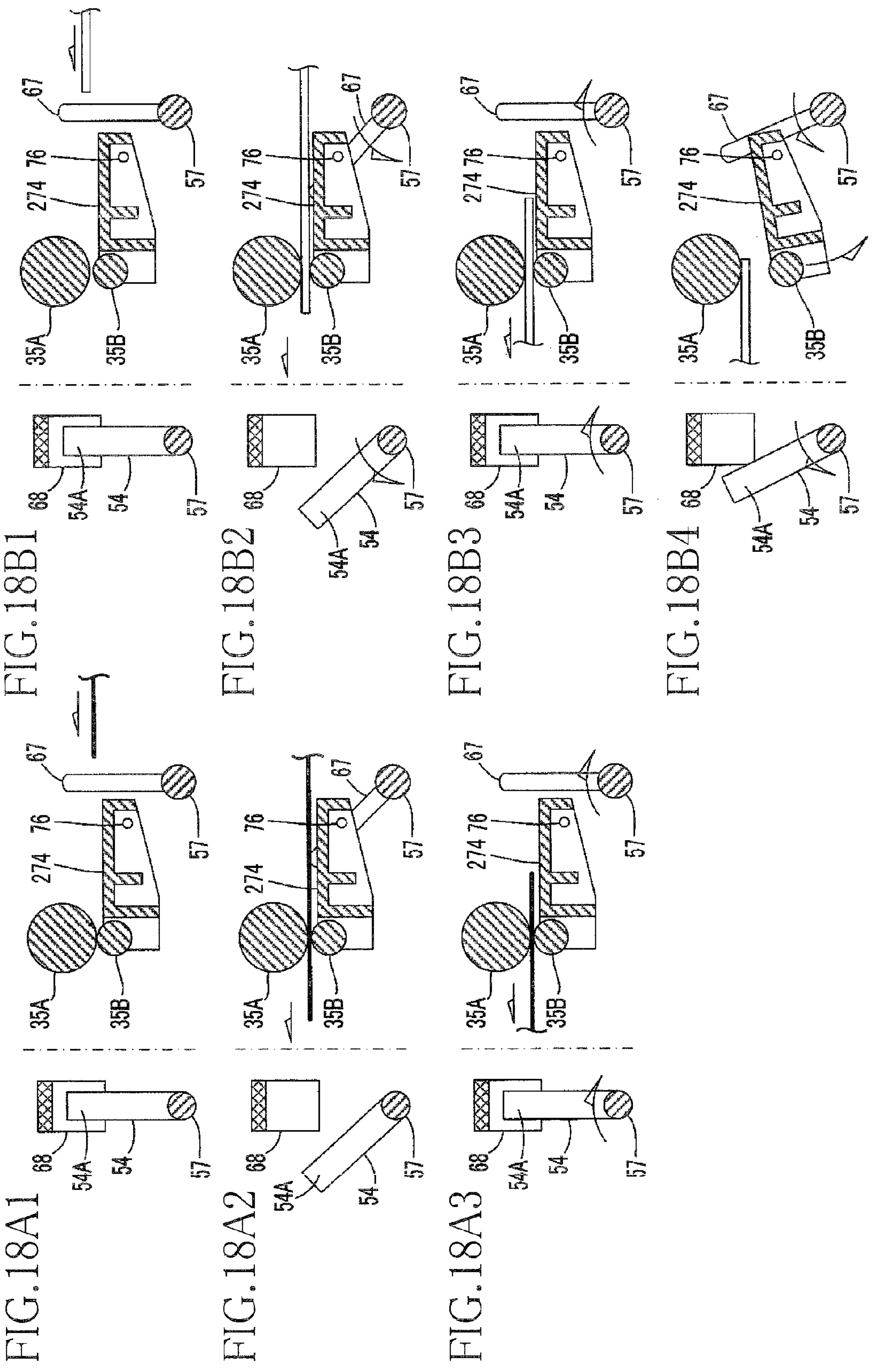
FIG.18A1
FIG.18A2
FIG.18A3
FIG.18B1
FIG.18B2
FIG.18B3
FIG.18B4

IMAGE RECORDING APPARATUS

CROSS REFERENCE TO RELATED APPLICATION

The present application claims priority from Japanese Patent Application Nos. 2010-221279 filed on Sep. 30, 2010, and 2010-221285 filed on Sep. 30, 2010, the disclosures of which are herein incorporated by reference in its entirety.

BACKGROUND OF THE INVENTION

1. Field of the Invention

The present invention relates to an image recording apparatus including a main frame having a pair of side plates facing each other and a base plate whose opposite end portions are supported by the respective side plates, and in particular, to a mechanism for mounting a sensor for sensing a recording medium being conveyed.

2. Description of the Related Art

There is conventionally known an image recording apparatus capable of recording images on both faces (sides) of a recording sheet. According to this image recording apparatus, in the case of one-side recording, an image is recorded on one face of the recording sheet, and then the recording sheet is discharged. On the other hand, in the case of two-side recording, after a recording sheet on one side of which an image has been recorded is conveyed again to a recording portion through a return conveying path that extends from a downstream side of the recording portion to an upstream side thereof, an image is recorded on the other side of the recording sheet, and then the recording sheet is discharged. Each of the above-described conveying path and the above-described return conveying path is defined by a guide member. The guide member is disposed so as to be interposed between a pair of side plates spaced from each other in a widthwise direction of the apparatus, and opposite end portions of the guide member are supported by the respective side plates, whereby the guide member is secured to the side plates. It is noted that there is known a frame as a connecting mechanism including a pair of side plates facing each other and a connecting member bridged laterally therebetween for connecting the side plates to each other.

SUMMARY OF THE INVENTION

Where the image recording is performed on the recording sheet conveyed to the recording portion through the conveying path, there is a need to sense a position of the recording sheet being conveyed with great accuracy in order to convey the recording sheet to an image-recording starting position before the image recording. In order to satisfy this need, there can be considered an image recording apparatus including: a guide member supported by a pair of side plates; a rotator projected from a central portion of the guide member in a widthwise direction of the apparatus so as to intersect a conveying path; and a sensor for sensing a movement of the rotator via an interlocking shaft when the rotator is pressed by the recording sheet conveyed in one direction. In order to reduce the number of components, a sensor mount is provided on one end of the guide member integrally with the guide member.

However, where the sensor mount is formed integrally with one end of the guide member, a length of the guide member becomes longer than a width of the conveying path. Thus, in the above-mentioned supporting mechanism whose opposite ends are respectively supported by a pair of side plates, a guide member is sometimes deformed by receiving too much force from a recording sheet being conveyed. In particular, in the case of a compact image recording apparatus including a two-side recording mechanism and usually placed on a desk, a conveying path and a return conveying path need to be provided at the same position in plan view in a height-limited space. As a result, the guide member needs to have less height and thickness. In this case, the guide member is more likely to be deformed. If the guide member is deformed, the sensor mount is displaced, making it impossible for the sensor to sense a movement of the rotator with great accuracy.

This invention has been developed in view of the above-described situations, and it is an object of the present invention to provide an image recording apparatus including a sensor that can sense a recording medium with great accuracy while preventing a positional displacement of a sensor mount.

The object indicated above may be achieved according to the present invention which provides an image recording apparatus comprising: a main frame including (a) a pair of side plates facing each other in one direction and (b) a base plate whose opposite end portions in the one direction are respectively supported by the pair of side plates; a guide member provided at an inside area interposed between a pair of side plates in the one direction, so as to define a conveying path through which a recording medium is conveyed; and a sensor device supported by one of the pair of side plates and configured to sense the recording medium conveyed through the conveying path.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIGS. 1A and 1B are perspective views showing external views of an MFP 10 as a first embodiment of the present invention, wherein FIG. 1A shows a state of the MFP 10 in which a tray guide 45 is accommodated therein, and FIG. 1B shows a state of the MFP 10 in which the tray guide 45 has been pulled out to a front side thereof;

FIGS. 5A and 5B are side views showing postures of a linkage plate 50, wherein FIG. 5A shows a state of the linkage plate 50 in which the linkage plate 50 is in an initial posture, and FIG. 5B shows a state of the linkage plate 50 in which the linkage plate 50 is in an expanded posture;

FIGS. 10A and 10B are perspective views showing an insertion state of a disc tray 48, wherein FIG. 10A shows a state in which a rear end of the disc tray 48 has been inserted into a position between rollers of a convey-roller pair 35, and FIG. 10B shows a state in which the rear end of the disc tray 48 has pushed down a rotator 67 rearward;

FIGS. 18A1-18B4 are schematic cross-sectional views for explaining operations of the roller holder 74, the rotator 67, and the detector 54 when an image is recorded on a recording sheet;

DETAILED DESCRIPTION OF THE EMBODIMENTS

Hereinafter, there will be described embodiments of the present invention by reference to the drawings.

Initially, a multi-function peripheral (MFP) 10 as a first embodiment will be explained. In the following explanation, there will be expressed (a) an upward and downward direction 7 on the basis of a state in which the MFP 10 is normally placed (i.e., a state of the MFP 10 shown in FIGS. 1A and 1B), (b) a frontward and rearward direction 8 by regarding a side of the MFP 10 on which an operation panel 16 is provided as a front side, and (c) a rightward and leftward direction 9 in a state in which the MFP 10 is seen from the front.

<Outline of MFP 10>

Figure 1A:
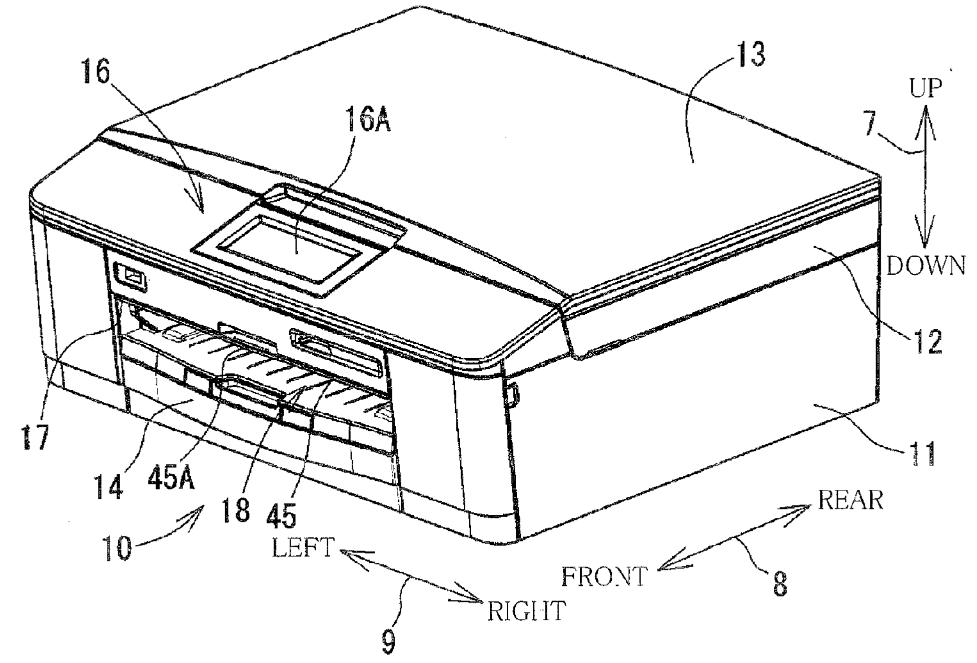
Figure 1B:
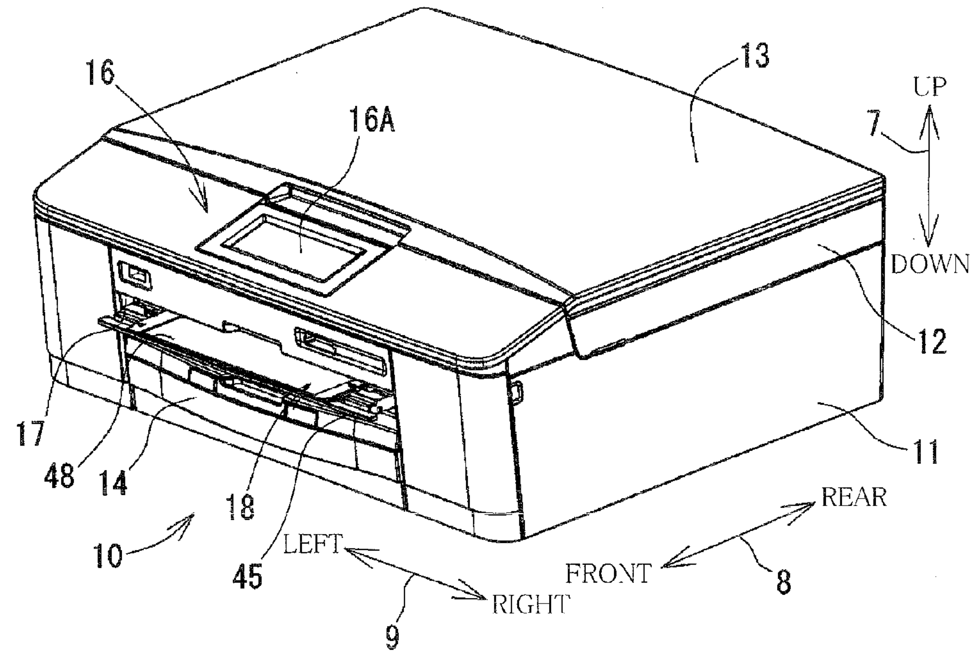

As shown in FIGS. 1A and 1B, the MFP 10 includes: a printer casing 11; a scanner casing 12 provided on a top of the printer casing 11; a document cover 13 provided on an upper portion of the scanner casing 12; the operation panel 16 having a liquid crystal display (LCD). The document cover 13 is supported by the scanner casing 12 so as to be opened and closed to sandwich a document (an original) with the scanner casing 12. An image of the document is scanned by a scanner, not shown, such as a flatbed scanner which is accommodated in the scanner casing 12. The scanner casing 12 accommodating the scanner therein is supported by the printer casing 11 so as to be opened and closed.

Figure 10A:
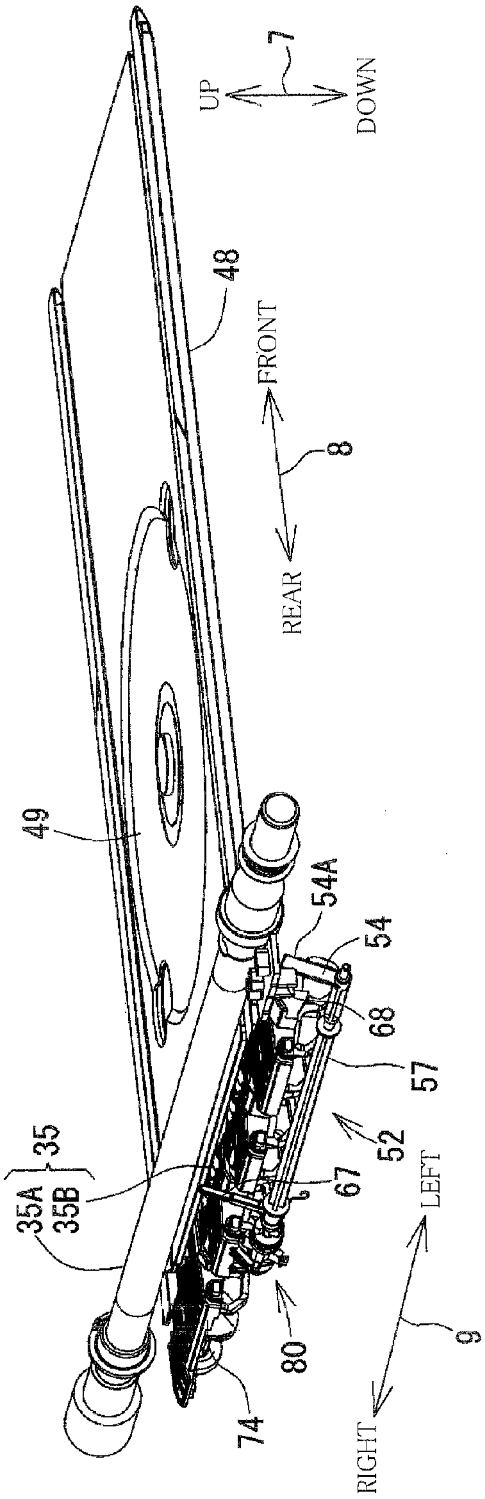

The printer casing 11 has an accommodation space 18 in its lower portion, and a sheet-supply cassette 14 (as one example of a supply source) is accommodated in the accommodation space 18. The accommodation space 18 is provided so as to expand from an opening 17 formed in a front face of the printer casing 11 to a rear portion of the printer casing 11. The sheet-supply cassette 14 is supported so as to be inserted into and removed from the accommodation space 18 in the frontward and rearward direction 8. The sheet-supply cassette 14 can accommodate a plurality of recording media in the form of recording sheets such as what is called plain paper sheets, postcards, and glossy paper sheets in a state in which the recording media are stacked on the sheet-supply cassette 14. A tray guide 45 is provided in an upper portion of the accommodation space 18. An upper face of the tray guide 45 is configured to support thereon a disc tray 48 (see FIGS. 10A and 10B) that can be inserted and removed in the frontward and rearward direction 8 on the upper face of the tray guide 45. The disc tray 48 has a planar plate shape having a thickness of about 3 mm and has a circular recessed portion 49 (see FIGS. 10A and 10B) in which a disc medium as one example of the recording medium such as a CD and a DVD is set.

A printing section 15 and the above-described scanner are controlled by a controller 100 (see FIG. 11) which will be described below. The controller 100 drives the printing section 15 to record the image on the recording medium on the basis of a signal(s) and/or data inputted from the operation panel 16 shown in FIGS. 1A and 1B or an external device such as a PC. Further, the controller 100 also executes a processing for sensing the presence or absence of the recording medium in the conveying path and a conveyed position of the recording medium.

<Printing Section 15>

Figure 2:
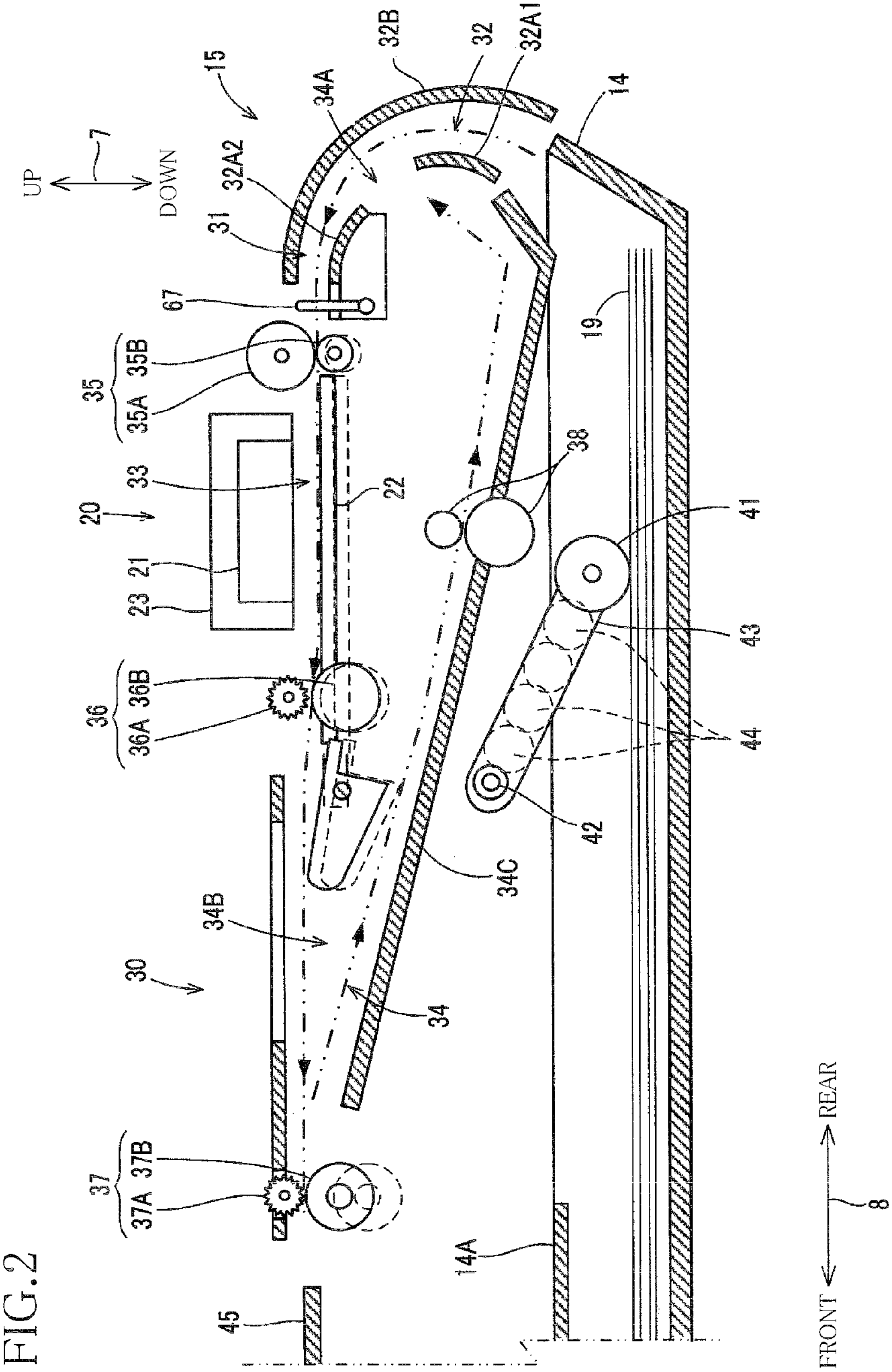
FIG. 2 is a cross-sectional view schematically showing a construction of a printing section 15.

The printing section 15 is configured to record an image on a conveyed recording medium. As shown in FIG. 2, the printing section 15 mainly includes: the sheet-supply cassette 14 for accommodating recording sheets 19; a conveying device 30 configured to convey the recording sheet 19 and the disc tray 48; a recording portion 20 configured to perform image recording on the recording sheet 19 and the disc medium on the disc tray 48; and a main frame 65 for supporting members such as the conveying device 30 and the recording portion 20.

<Recording Portion 20>

The recording portion 20 includes: a recording head 21 disposed on an upper side of a rear portion of the sheet-supply cassette 14; a carriage 23 for supporting the recording head 21; a rail, not shown, for supporting the recording head 21 together with the carriage 23 such that the recording head 21 is slidable in the rightward and leftward direction 9; and a carriage motor 111 (see FIG. 11); and a drive portion having a drive-power transmitting mechanism for transmitting a drive power generated by the carriage motor 111 to the carriage 23.

<Recording Head 21>

In the recording head 21 are formed nozzles respectively having ejection openings. These nozzles are deformed by piezoelectric elements, for example, causing ink droplets to be ejected downward from the ejection openings toward a platen 22. Further, the recording head 21 is reciprocated in the rightward and leftward direction 9 by the drive power of the carriage motor 111. As will be described later, in a process in which the recording sheet 19 or the disc medium on the disc tray 48 is conveyed frontward on the platen 22, ink is ejected from the recording head 21 reciprocated in the rightward and leftward direction 9, whereby the image may be recorded on an generally entire face of the recording sheet 19 or the disc medium.

<Main Frame 65>

Figure 3:
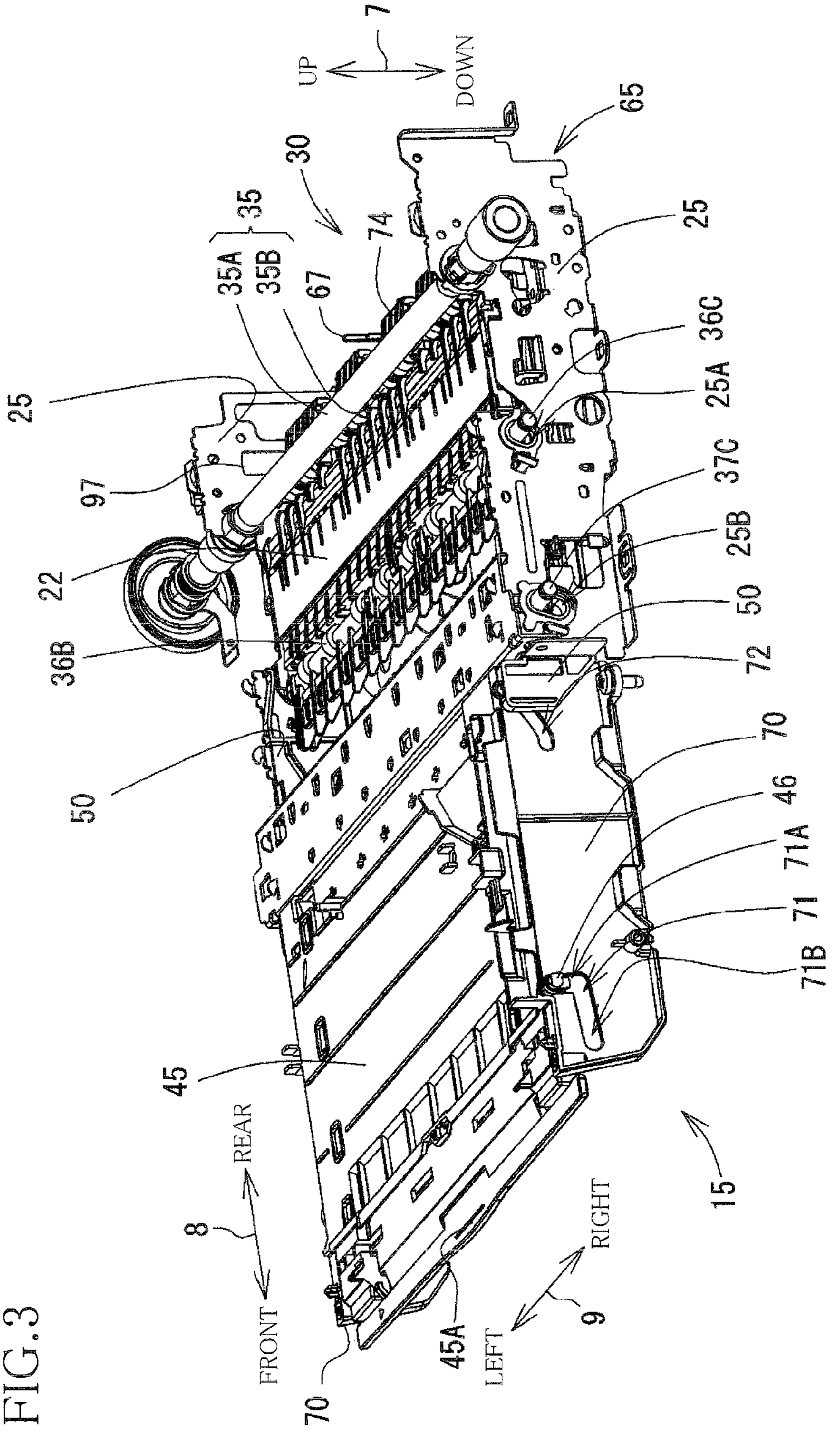
FIG. 3 is a perspective view showing the construction of the printing section 15 and a construction of a conveying device 30.
Figure 6:
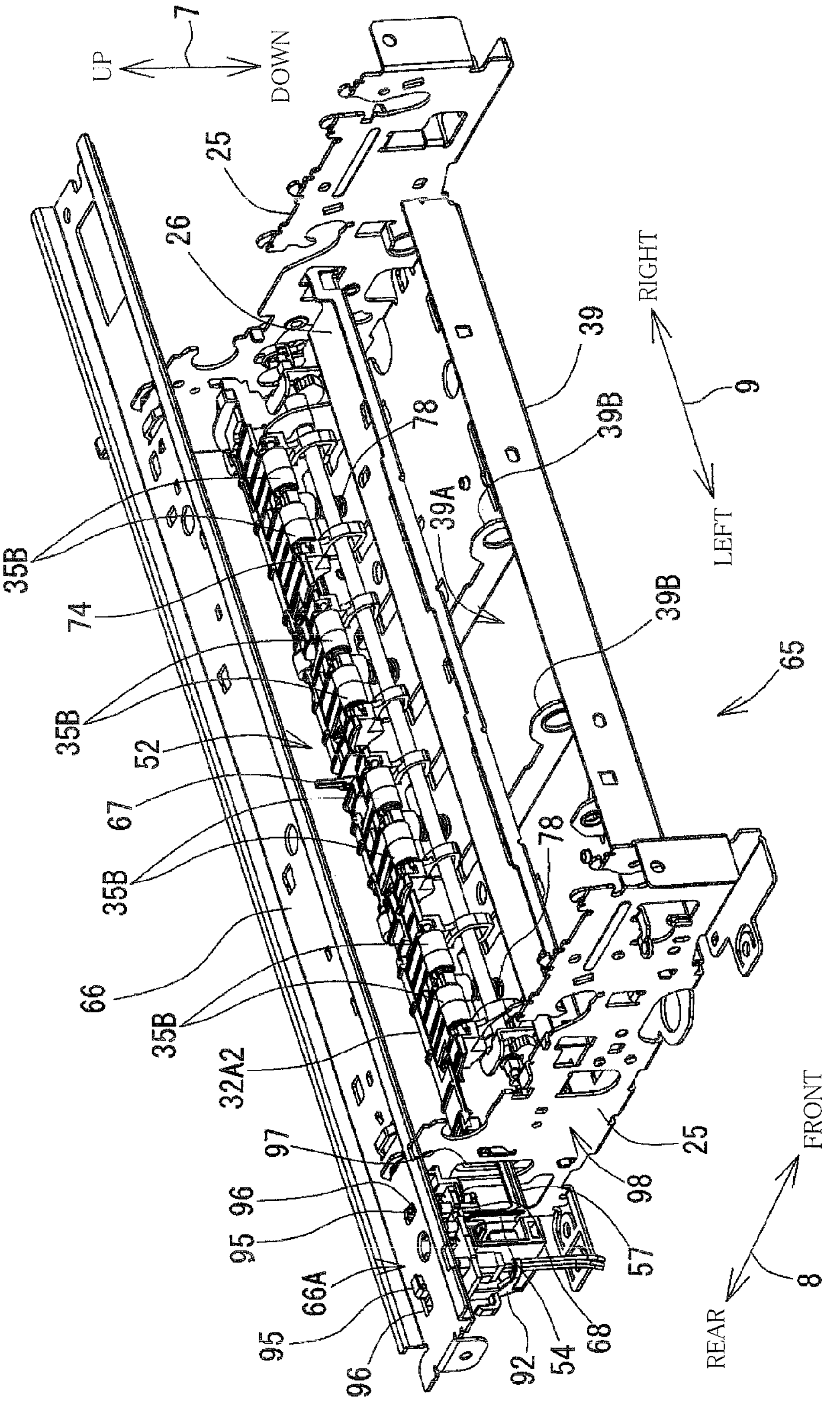
FIG. 6 is a perspective view showing a construction of the main frame 65.
Figure 7:
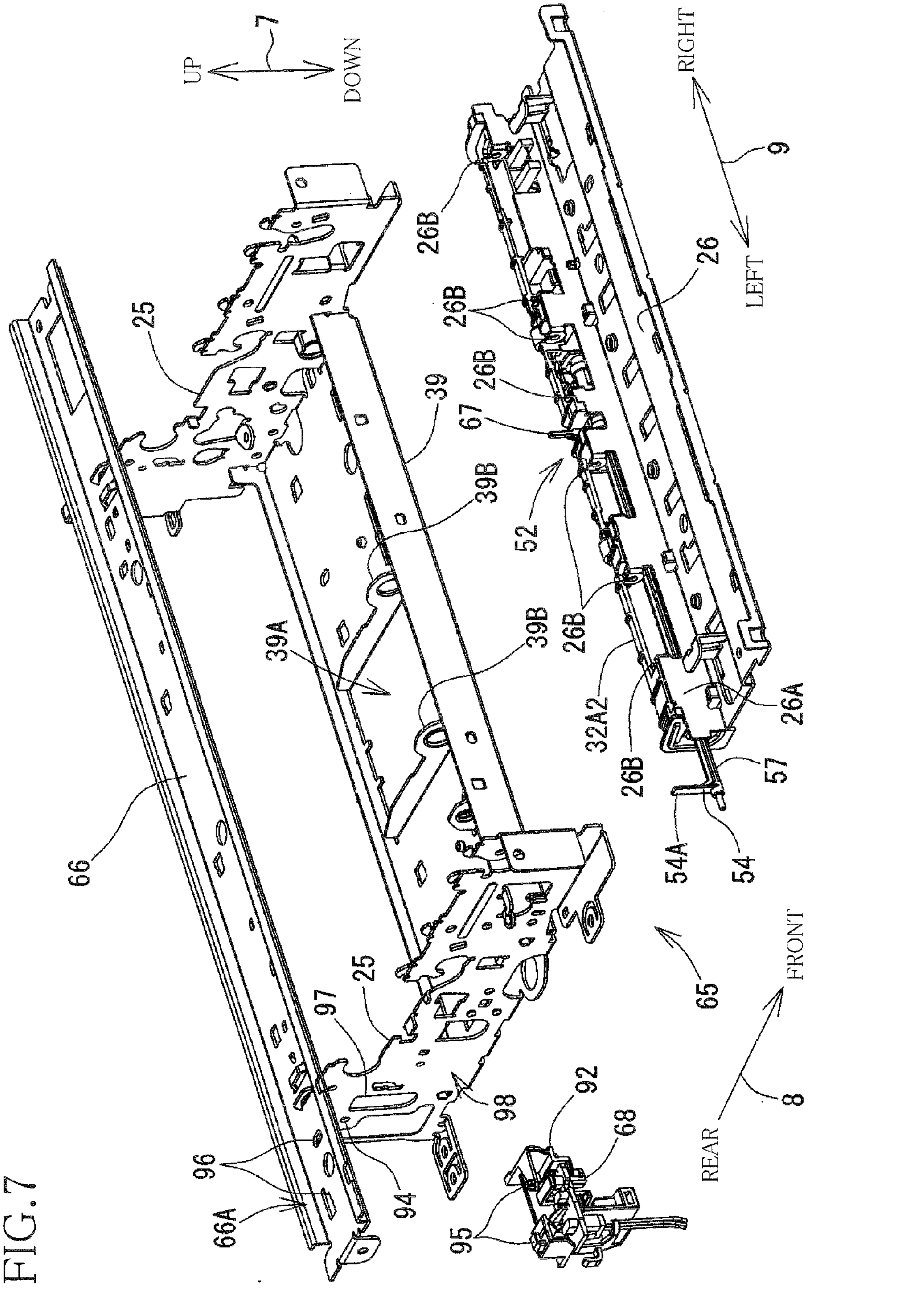
FIG. 7 is an exploded perspective view showing the construction of the main frame 65.

As shown in FIG. 3, the main frame 65 is provided on a rear side of the printing section 15. As shown in FIGS. 6 and 7, the main frame 65 includes: a pair of first frames 25 (as one example of a pair of side plates); a base frame 39 (as one example of a base plate); a sub-frame 26 (as one example of a sub-plate); and a pair of second frames 70.

<First Frames 25>

As shown in FIGS. 6 and 7, the first frames 25 are provided so as to face each other with a predetermined distance therebetween in the rightward and leftward direction 9. Each of the first frames 25 is formed of a metal plate having a generally rectangular shape elongated in the frontward and rearward direction 8. The base frame 39 is provided between the first frames 25, and opposite ends of the base frame 39 are supported by the first frames 25. For example, projections are respectively provided on the opposite ends of the base frame 39, and cutouts are respectively formed in lower ends of the respective first frames 25. The projections of the base frame 39 are fitted in the cutouts of the respective first frames 25, whereby the base frame 39 is supported by the first frames 25 and secured to the first frames 25.

On the main frame 65 is mounted a rail 66 (as one example of a support plate). The rail 66 has a shape elongated in the rightward and leftward direction 9. The rail 66 is supported by upper ends of rear end portions of the respective first frames 25. On a rear side of the rail 66, there is provided another rail, not shown, having the same construction as that of the rail 66. The rail 66 supports a front end of the carriage 23 slidably thereover in the rightward and leftward direction 9, and the other rail supports a rear end of the carriage 23 slidably thereover in the rightward and leftward direction 9. This supporting mechanism supports the carriage 23 and the recording head 21 slidably thereover in the rightward and leftward direction 9. Opposite ends of the rail 66 are respectively located outside of the first frames 25 in the rightward and leftward direction 9. That is, a left end of the rail 66 is located on a left side of the left first frame 25, and a right end of the rail 66 is located on a right side of the right first frame 25. The carriage 23 is thus movable not only between the first frames 25 but also to the outside of the first frames 25 in the rightward and leftward direction 9.

As shown in FIG. 3, the platen 22 is disposed in a space between the first frames 25. As will be described later, opposite ends of the platen 22 are respectively supported by the first frames 25. Each of the first frames 25 has elongate holes 25A, 25B formed therein. The elongate hole 25A is a hole through which a support shaft 36C of a discharging rollers 36B described below passes, and the elongate hole 25B is a hole through which a support shaft 37C of switch-back rollers 37B (see FIG. 4) passes. Each of the elongate holes 25A, 25B has a shape elongated in the upward and downward direction 7 such that the support shafts 36C, 37C are movable in the upward and downward direction 7.

<Base Frame 39>

As shown in FIGS. 6 and 7, the base frame 39 is formed of a metal plate having a generally rectangular shape elongated in the rightward and leftward direction 9. An opening 39A is formed in the base frame 39 at a central portion thereof in the rightward and leftward direction 9. Bearings 39B are respectively provided on opposite edge portions of the opening 39A in the rightward and leftward direction 9. These bearings 39B support thereon a support shaft 42 of a sheet-supply roller 41 (see FIG. 2) which will be described below. Opposite edge portions of the base frame 39 in the frontward and rearward direction 8 are bent upward, and the above-described projections to be fitted in the cutouts formed in the first frames 25 are provided on opposite end portions of the bent portions.

<Sub-frame 26>

The sub-frame 26 is provided between the first frames 25 and on an upper side of the base frame 39. The sub-frame 26 is formed of a metal plate elongated in the rightward and leftward direction 9. Opposite ends of the sub-frame 26 are respectively supported by the respective first frames 25. For example, projections are provided on the opposite ends of the sub-frame 26, and cutouts are formed in the first frames 25. The projections of the sub-frame 26 are fitted in the cutouts of the first frames 25, whereby the sub-frame 26 is supported by the first frames 25 and secured to the first frames 25. As will be described below, a roller holder 74 and an inner guide member 32A2 are mounted on the sub-frame 26.

<Second Frames 70>

As shown in FIG. 3, the second frames 70 are provided on a front side of the first frames 25. Specifically, the second frames 70 are provided so as to face each other with a predetermined distance therebetween in the rightward and leftward direction 9. Each of the second frames 70 is a plate member formed of a synthetic resin and secured to the printer casing 11. The tray guide 45 is disposed in a space between the second frames 70. Opposite ends of the tray guide 45 are respectively supported by the second frames 70. In each of the second frames 70 are formed a pair of front and rear guide openings 71, 72 through which support projections 46 of the tray guide 45 that will be described below are selectively inserted. The front guide opening 71 includes: a straight portion 71A formed along the upward and downward direction 7; and an inclined portion 71B inclined obliquely downward while extending frontward from a lower end of the straight portion 71A. The rear guide opening 72 is inclined obliquely downward while extending frontward. A lower end of the rear guide opening 72 is located at the same height as a lower end of the inclined portion 71B of the guide opening 71. Where the support projections 46 are disposed at the straight portions 71A of the respective guide openings 71, the second frames 70 lock the tray guide 45 so as not to be moved in the frontward and rearward direction 8. Where the support projections 46 are disposed at the inclined portions 71B, the second frames 70 support the tray guide 45 movably in the frontward and rearward direction 8.

<Conveying Device 30>

Figure 4:
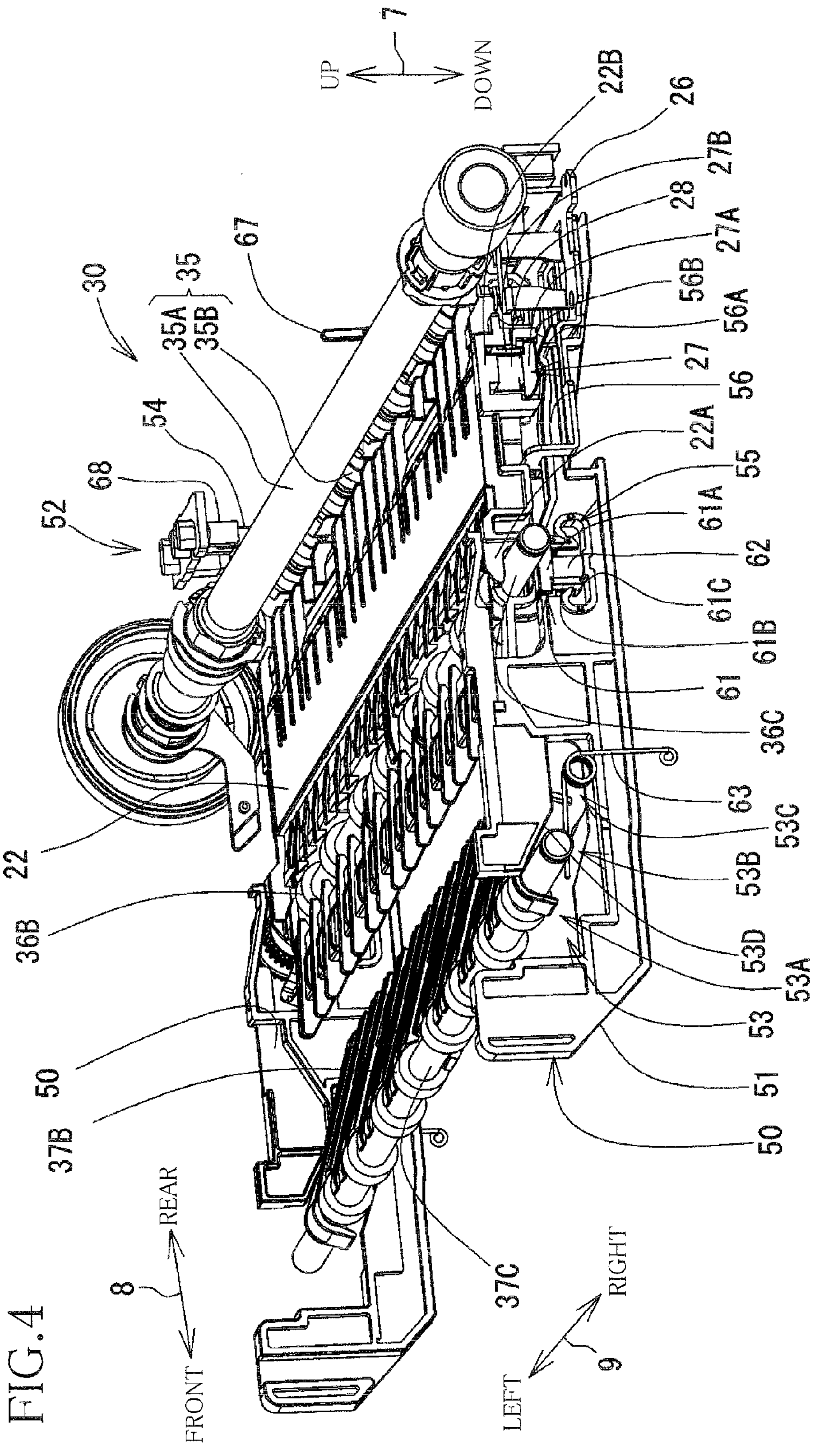
FIG. 4 is a perspective view showing the construction of the conveying device 30.

As shown in FIG. 4, the conveying device 30 includes: the sheet-supply roller 41 (see FIG. 2); a convey-roller pair 35; a discharging-roller pair 36; a switch-back-roller pair 37; a sheet-return-roller pair 38; members (which will be described below) for defining a conveying path 31 (see FIG. 2, as one example of a conveying path); linkage plates 50 for expanding the conveying path 31; a tray guide 45; a sensing mechanism 52 for sensing, e.g., conveyed positions of the recording medium and the disc tray 48 (see FIGS. 1A and 1B) in the conveying path 31; a rotation restraining mechanism 80 (see FIG. 8); a sheet-supply motor 112 (see FIG. 11) for driving the sheet-supply roller 41; and a conveyance motor 113 (see FIG. 11) for driving the above-described roller pairs.

<Sheet-supply Roller 41>

The sheet-supply roller 41 is rotatable to supply to the conveying path 31 an uppermost one of the recording sheets 19 stacked on the sheet-supply cassette 14. As shown in FIG. 2, the sheet-supply roller 41 is disposed on an upper side of the rear portion of the sheet-supply cassette 14 so as to be rotatably supported at a distal end of an arm 43 that is pivotable about the support shaft 42. The support shaft 42 is supported by the bearings 39B (see FIG. 6) of the base frame 39 so as to be rotatable about a central axis of the support shaft 42. A drive power of the sheet-supply motor 112 is transmitted to the support shaft 42 and then to the sheet-supply roller 41 via a plurality of transmission gears 44, thereby rotating the sheet-supply roller 41. When the sheet-supply roller 41 is rotated while contacting the recording sheet 19, the recording sheet 19 is supplied to the conveying path 31.

<Conveying Path 31>

As shown in FIG. 2, the conveying path 31 is constituted by a first conveying path 32, a second conveying path 33, and a return conveying path 34 (as one example of a third path). The first conveying path 32 is a curved path extending upward from a rear end portion of the sheet-supply cassette 14 so as to reach a position located on a rear side of the platen 22. That is, the first conveying path 32 has an arc shape in its cross section in which one end thereof is located on the rear end portion of the sheet-supply cassette 14, and the other end thereof is located on a rear side of the platen 22. The second conveying path 33 is a straight path in its cross section that extends from a terminal end of the first conveying path 32 toward the recording portion 20 and passes through a position between the platen 22 and the recording head 21. The return conveying path 34 is a straight path passing through a position under the platen 22 and connecting the first conveying path 32 and the second conveying path 33 to each other.

<First Conveying Path 32>

The first conveying path 32 is defined by an inner guide member 32A1, the inner guide member 32A2, and an outer guide member 32B each having an arc shape. The inner guide members 32A1, 32A2 and the outer guide member 32B are disposed so as to face each other in a radial direction thereof. The inner guide member 32A1 functions as a lower guide face for the first conveying path 32, and the inner guide member 32A2 functions as an upper guide face for the first conveying path 32. Between the inner guide member 32A1 and the inner guide member 32A2, there is formed a connection opening 34A (as one example of a meeting point) to which one end of the return conveying path 34 is connected. It is noted that the inner guide member 32A1, the inner guide member 32A2, and the outer guide member 32B are examples of a guide member.

As shown in FIG. 7, the inner guide member 32A2 is secured to a rear end of the sub-frame 26. The inner guide member 32A2 has a generally C shape in its cross section and is elongated in the rightward and leftward direction 9. A plurality of claws 64 (see FIG. 8) are provided on a front end of the inner guide member 32A2. A vertical wall 26A stands upright from the rear end of the sub-frame 26. The claws 64 are engaged with an upper end of the vertical wall 26A and cutouts formed in the vertical wall 26A, whereby the inner guide member 32A2 is secured to the sub-frame 26.

<Second Conveying Path 33>

The second conveying path 33 is a straight path defined by the recording head 21 and the platen 22 disposed so as to face the recording head 21. Not only the recording sheet 19 supplied from the sheet-supply cassette 14 but also the disc tray 48 inserted from the opening 17 passes through the second conveying path 33. The convey-roller pair 35 is provided on a rear side of the recording portion 20, in other words, on an upstream side of the recording portion 20 in a direction (first conveyance direction) in which the recording medium is conveyed in the image recording. The discharging-roller pair 36 is provided on a front side of the recording portion 20. The switch-back-roller pair 37 is provided on a front side of the discharging-roller pair 36. Between the switch-back-roller pair 37 and the discharging-roller pair 36, there is formed a connection opening 34B (as one example of a branch point) to which is connected a front end portion of the return conveying path 34. The second conveying path 33 is formed so as to extend from the convey-roller pair 35 to the switch-back-roller pair 37.

<Return Conveying Path 34>

The return conveying path 34 is used for two-side recording and defined by a guide member 34C that is disposed under the platen 22. The front end portion of the return conveying path 34 is connected to the connection opening 34B of the second conveying path 33, and a rear end portion of the return conveying path 34 is connected to the connection opening 34A of the first conveying path 32. The sheet-return-roller pair 38 is provided on the guide member 34C such that a roller face of one roller of the sheet-return-roller pair 38 is exposed to the return conveying path 34. The sheet-return-roller pair 38 is rotated by receiving a drive power of the conveyance motor 113. The recording sheet 19 supplied from the sheet-supply cassette 14 is guided by the first conveying path 32 and the second conveying path 33 and reaches the recording portion 20. The recording sheet 19 then passes through the second conveying path 33 and is discharged onto a sheet-discharge portion 14A.

<Convey-Roller Pair 35>

As shown in FIG. 3, the convey-roller pair 35 is constituted by an upper conveying roller 35A as a drive roller and lower pressing rollers 35B as a driven roller which sandwich the second conveying path 33 therebetween in the upward and downward direction. The upper conveying roller 35A is supported by the first frames 25 so as to be roatable about a central axis of the upper conveying roller 35A. The upper conveying roller 35A is rotated by receiving the drive power of the conveyance motor 113 (see FIG. 11). The lower pressing rollers 35B are supported by the roller holder 74 (which will be described below) so as to be rotatable about a central axis of the lower pressing rollers 35B.

<Roller Holder 74>

As shown in FIG. 6, the roller holder 74 is provided on a rear side of the main frame 65. The roller holder 74 is independent of the platen 22. The roller holder 74 has four blocks connected to one another in the rightward and leftward direction 9, so that the roller holder 74 has an elongated shape in the rightward and leftward direction 9 in its entirety. Each of the pressing rollers 35B is rotatably supported by a front upper end of a corresponding one of the blocks. In the present embodiment, the roller holder 74 supports the eight pressing rollers 35B arranged in a row in the rightward and leftward direction 9. A plurality of support shafts, not shown, are provided on the rear upper end portion of the roller holder 74. These support shafts are supported by bearings 26B (see FIG. 7) provided on the sub-frame 26. This construction allows the roller holder 74 to be pivoted about the support shafts. More specifically, the roller holder 74 is pivotable about the support shafts between (i) a contact posture in which the pressing rollers 35B contact the upper conveying roller 35A and (ii) a distant posture in which the pressing rollers 35B are distant from the conveying roller 35A.

As shown in FIG. 6, coil springs 78 are provided between the roller holder 74 and the sub-frame 26. The coil springs 78 are provided at positions near the pressing rollers 35B such that a direction in which the coil springs 78 are extended or contracted coincides with the upward and downward direction 7. The coil springs 78 are provided between the roller holder 74 and the sub-frame 26 in a state in which the coil springs 78 are contracted in advance to apply a preset urging force to the conveying roller 35A. As a result, an upward urging force generated by extension movement of the coil springs is applied to the roller holder 74, causing the roller holder 74 to maintain the above-described contact posture. The upward urging force of the coil springs 78 is applied to the pressing rollers 35B via the roller holder 74, whereby the pressing rollers 35B are held in pressing contact with the conveying roller 35A. In the present embodiment, when a front end portion of the roller holder 74 is lowered against the above-described urging force by receiving a drive power from a drive source such as a motor, the roller holder 74 is changed from the contact posture to the distant posture, so that the pressing rollers 35B are moved downward away from the conveying roller 35A.

<Sensing Mechanism 52>

The sensing mechanism 52 is configured to sense or detect the conveyed position of the recording sheet 19 and the conveyed position of the disc tray 48 in the conveying path 31, for example. This sensing mechanism 52 is configured to sense the conveyed position of the recording sheet 19 in the case of a normal recording mode in which the image is recorded on the recording sheet 19 supplied from the sheet-supply cassette 14. Further, this sensing mechanism 52 is configured to sense the conveyed position of the disc tray 48 in the case of a label recording mode in which the image is recorded on the disc medium on the disc tray 48. As shown in FIG. 6, the sensing mechanism 52 is provided on a rear side of the roller holder 74 and between the inner guide member 32A2 and the roller holder 74. The sensing mechanism 52 is constituted by an optical sensor 68, a rotation shaft 57 (as one example of the support shaft), a rotator 67 (as one example of a first detector), and a detector 54 (as one example of a second detector).

Figure 8:
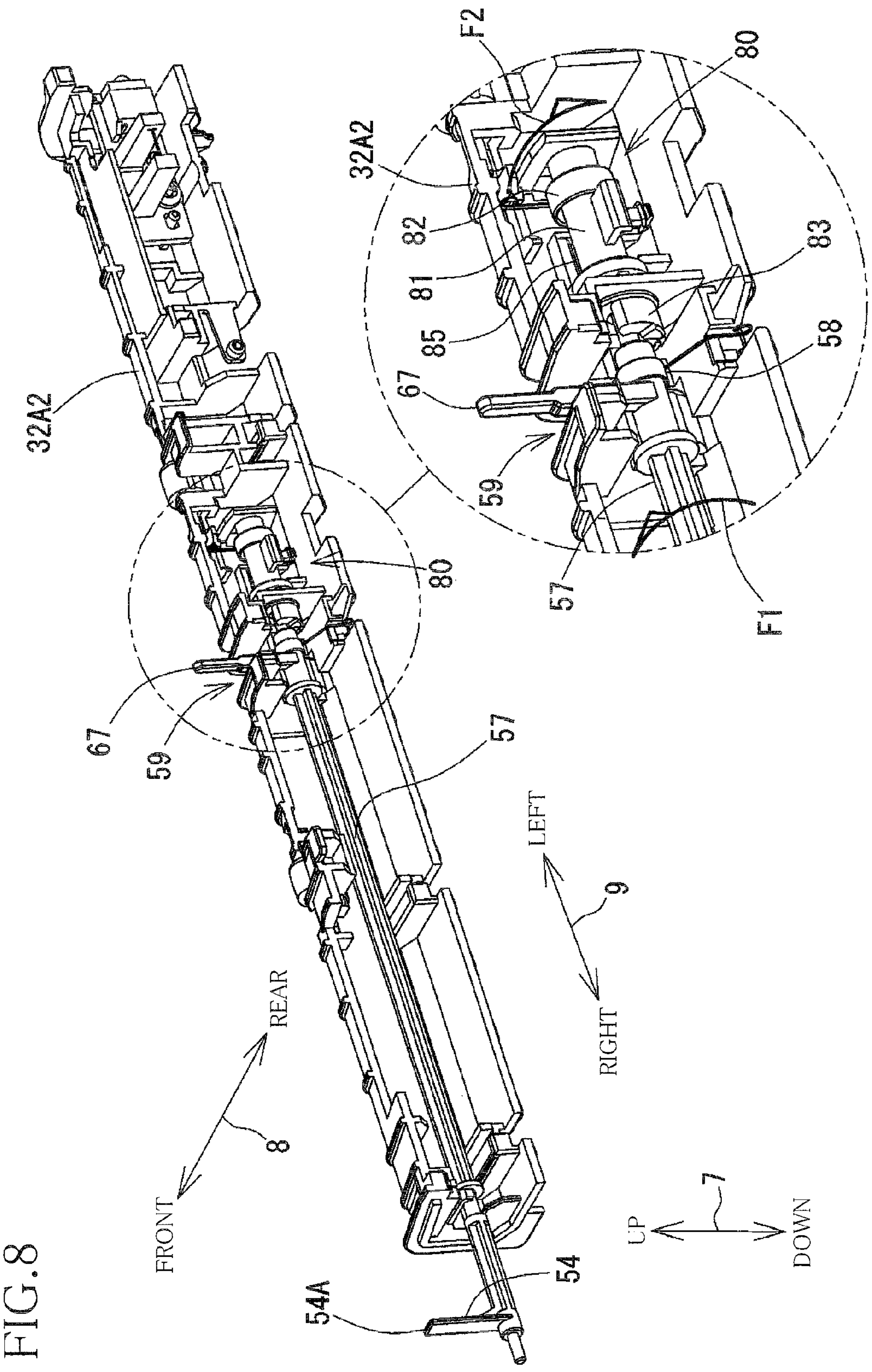
FIG. 8 is a perspective view showing a construction of a sensing mechanism 52.

As shown in FIG. 8, the rotation shaft 57 is rotatably supported by the inner guide member 32A2 and located at a front of the inner guide member 32A2, that is, on the other side of the inner guide member 32A2 from the guide face for guiding the recording sheet. The rotation shaft 57 extends leftward from a central portion between the first frames 25 in the rightward and leftward direction 9. In the left first frame 25 is formed an elongate hole 97 (see FIG. 6) which is elongated in the upward and downward direction 7 and through which the rotation shaft 57 is inserted. The rotation shaft 57 extends through the elongate hole 97 to a position outside (i.e., on a left side of) the left first frame 25 and a left end portion of the inner guide member 32A2.

The rotator 67 having an arm shape is fixed to the rotation shaft 57. A slit 59 is formed in a central portion of the inner guide member 32A2 in the rightward and leftward direction 9. The rotator 67 is projected upward from the rotation shaft 57 through the slit 59 and exposed outward from the inner guide member 32A2. The detector 54 is provided on a left end of the rotation shaft 57. The detector 54 is projected in the same direction as the rotator 67. The rotator 67 and the detector 54 are fixed to the rotation shaft 57. Accordingly, when a force has been applied to the rotator 67 in its rotational direction, the detector 54 is rotated with the rotator 67 in the direction in which the rotator 67 is rotated.

<Optical Sensor 68>

Figure 9:
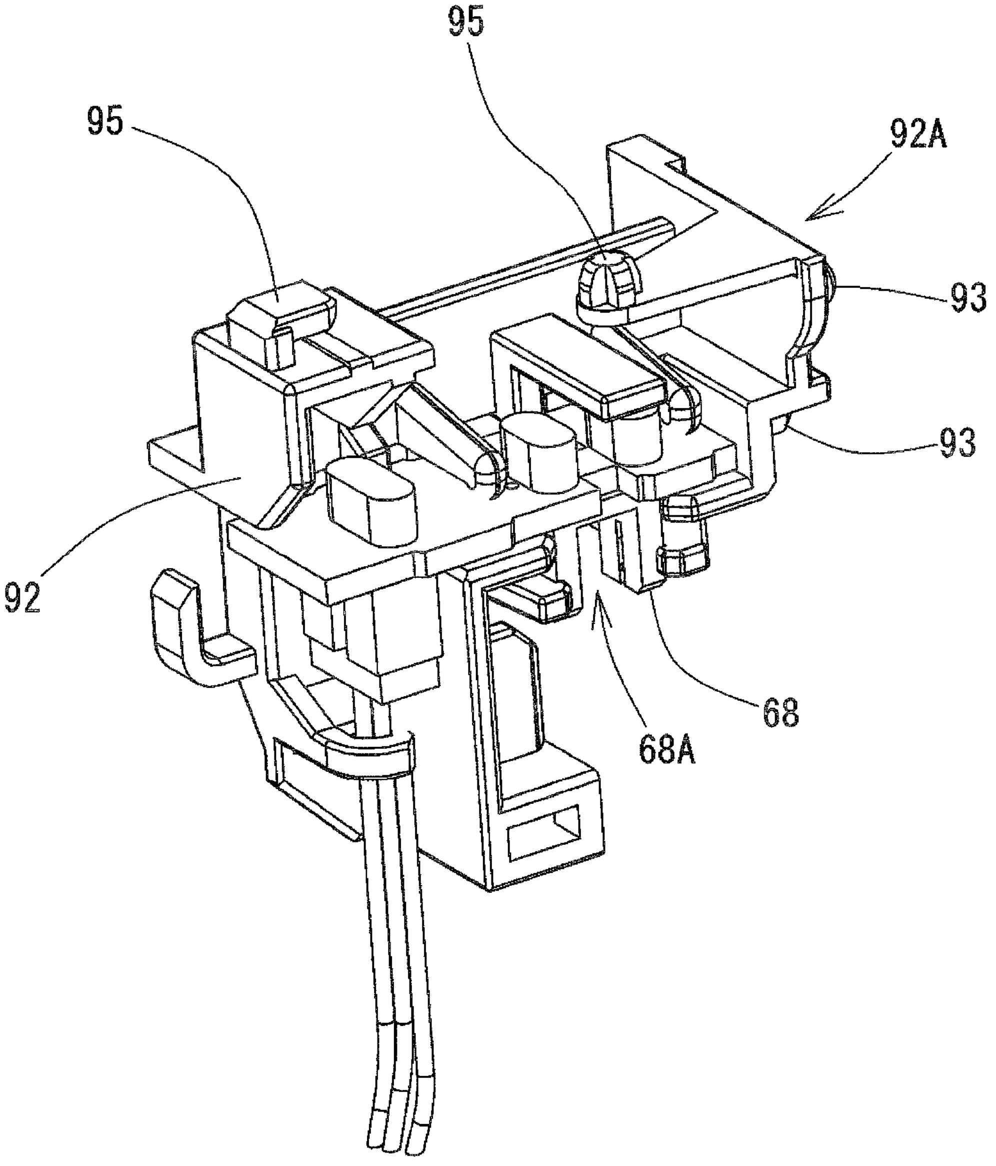
FIG. 9 is an enlarged perspective view showing a construction of a sensor holder 92.

As shown in FIG. 9, the optical sensor 68 is a photo interrupter of a transmission type having a light emitting element and a light receiving element disposed so as to face each other. When the light receiving element has received light emitted from the light emitting element, the optical sensor 68 outputs an electric signal (a sensor signal) in accordance with an amount (an intensity) of the received light. The light emitting element and the light receiving element are disposed on a distal end of the optical sensor 68, functioning as a sensing portion 68A of the optical sensor 68. In a light path through which the light emitted from the light emitting element travels to the light receiving element, the sensing portion 68A can detect the recording sheet 19 or the disc tray 48. The optical sensor 68 is secured to a sensor holder 92 (as one example of the support member). The optical sensor 68 and the sensor holder 92 are one example of a sensor device.

The sensor holder 92 is mounted on an outer face 98 of the left first frame 25 (see FIG. 6). That is, the sensor holder 92 is provided on a left side of the left end portion of the inner guide member 32A2 and the left first frame 25. One example of a method of mounting the sensor holder 92 on the first frame 25 is as follows: a plurality of projections 93 are provided on a mount face 92A of the sensor holder 92 which is mountable on an outer face 98 of the left first frame 25, a plurality of mount holes 94 (see FIG. 7) are formed in the first frame 25, and the projections 93 of the sensor holder 92 are respectively fitted into the mount holes 94 of the first frame 25, thereby securing the sensor holder 92 to the outer face 98 of the first frame 25. Further, the sensor holder 92 is also mounted on a left end portion 66A of the rail 66 (see FIG. 6), i.e., on a portion of a lower face of the rail 66 which is located on a left side of the left first frame 25. One example of a method of mounting the sensor holder 92 on the rail 66 is as follows: a plurality of engaging pieces 95 are provided on an upper portion of the sensor holder 92 which is mountable on the left end portion 66A, a plurality of mount holes 96 (see FIG. 6) are formed in the left end portion 66A of the rail 66, and the engaging pieces 95 of the sensor holder 92 are respectively engaged with the mount holes 96 of the rail 66, thereby securing the sensor holder 92 to the left end portion 66A of the rail 66. As a result, the sensor holder 92 and the optical sensor 68 secured thereto are reliably secured to the outer face 98 of the first frames 25 and the left end portion 66A of the rail 66.

The optical sensor 68 is mounted on the sensor holder 92 such that the light path of the sensing portion 68A is located within a range of a pivotal movement of the detector 54. In the present embodiment, when neither of the recording sheet 19 nor the disc tray is in the conveying path 31, a distal end portion 54A of the detector 54 enters into the light path of the sensing portion 68A to intercept the light path (see FIG. 6). In this case, a sensor signal of a LOW level is outputted from the optical sensor 68. When the sensor signal of the LOW level has been outputted, the controller 100 of the MFP 10 judges that the distal end portion 54A has entered in the light path of the sensing portion 68A and that the recording medium has not reached the rotator 67. When the recording sheet 19 or the disc tray is guided and conveyed through the conveying path 31 to push down the rotator 67, the detector 54 is pivoted, so that the distal end portion 54A thereof is retracted from the light path of the sensing portion 68A. In this movement, a sensor signal of a HIGH level is outputted from the optical sensor 68. When the sensor signal has been changed from the LOW level to the HIGH level, the controller 100 judges that the distal end portion 54A has been retracted from the light path of the sensing portion 68A and that the recording sheet 19 or the disc tray 48 has reached the rotator 67.

<Rotation Restraining Mechanism 80>

As shown in FIG. 8, a torsion coil spring 58 (hereinafter may be called "spring 58") is mounted on the rotator 67. The spring 58 applies to the rotator 67 an urging force F1 for pivoting the rotator 67 rearward from a posture thereof shown in FIG. 8. On a right end portion of the rotation shaft 57, there is mounted the rotation restraining mechanism 80 for restraining or inhibiting the pivotal movement of the rotator 67 caused by the urging force F1. The rotation restraining mechanism 80 includes: a joint 83 connected to the right end portion of the rotation shaft 57; a restraining member 81 fixed to the joint 83; and a torsion coil spring 82 (hereinafter may be called "spring 62") mounted on the restraining member 81. The joint 83 is connected to the right end portion of the rotation shaft 57 so as to be rotatable aboutan axis of the rotation shaft 57. This joint 83 is configured to allow the rotator 67 to be pivoted frontward from its posture shown in FIG. 8 and to restrain or inhibit the rotator 67 from being pivoted rearward.

As shown in FIG. 8, the restraining member 81 has a stopper 85 projected in a direction perpendicular to the rotation shaft 57. The stopper 85 is projected rearward from the restraining member 81. The spring 82 applies to the restraining member 81 an urging force F2 that is greater than the urging force generated by the spring 58. This urging force F2 causes the restraining member 81 to be pivoted in a direction in which the spring 58 urges the restraining member 81. That is, the urging force F2 is applied in a direction opposite to a direction in which the urging force F1 is applied. The stopper 85 is, for example, engaged with the inner guide member 32A2, thereby restraining a pivotal movement of the restraining member 81 such that the rotator 67 maintains its posture (see FIG. 8) in which the rotator 67 is projected upward from the slit 59. These constructions enable the forces applied to the members to be balanced with one another, thereby maintaining the rotator 67 in the posture shown in FIG. 8, i.e., a posture in which the rotator is projected upward from the rotation shaft 57 so as to intersect the second conveying path 33. When the rotator 67 has been pressed frontward by the recording sheet 19 from a rear side of the rotator 67, the rotator 67 is pivoted against the urging force F1 of the spring 58 so as to be pressed down frontward. When the rotator 67 has been pressed rearward by the disc tray 48 from a front side of the rotator 67, the rotator 67 is pivoted against the urging force F2 of the spring 82 so as to be pressed down rearward.

<Discharging-Roller Pair 36>

As shown in FIG. 2, the discharging-roller pair 36 is constituted by an upper pinch roller 36A and the lower discharging rollers 36B which sandwich the second conveying path 33 therebetween in the upward and downward direction 7. The pinch roller 36A is supported by the first frames 25, for example, so as to be rotated about a central axis of the pinch roller 36A. It is noted that the illustration of the pinch roller 36A is omitted in FIGS. 3 and 4.

As shown in FIGS. 3 and 4, the discharging rollers 36B are movable in the upward and downward direction 7 between (i) a contact posture in which the discharging rollers 36B contact the pinch roller 36A by being supported by the linkage plates 50 which will be described below and (ii) a distant posture in which the discharging rollers 36B are located under the pinch roller 36A so as to be spaced from the pinch roller 36A by being supported by the first frames 25 at a position below the contact posture. Specifically, the support shaft 36C of the discharging rollers 36B passes through the above-described elongate holes 25A formed in the first frames 25. The discharging rollers 36B are urged upward by second springs 62 which will be described below. Accordingly, unless an external force other than the urging force of the second springs 62 is applied to the discharging rollers 36B, the discharging rollers 36B are pressed by the second springs 62, maintaining a state in which the discharging rollers 36B are held in pressing contact with the pinch roller 36A. When the discharging rollers 36B taking its state have received the drive power of the conveyance motor 113 (see FIG. 11), the discharging rollers 36B are rotated, and the pinch roller 36A is rotated accordingly.

<Platen 22>

As shown in FIG. 4, the platen 22 having a plate shape is provided on a rear side of the roller holder 74. On right and left sides of a front end portion of the platen 22, there are provided a pair of right and left support projections 22A projected rearward. Each of the support projections 22A is projected frontward to a position just above the support shaft 36C of the discharging rollers 36B, and a lower end of the support projection 22A is supported by the support shaft 36C. That is, the platen 22 is supported at its front portion by the support shaft 36C of the discharging rollers 36B. Accordingly, when the discharging rollers 36B are moved in the upward and downward direction 7, the platen 22 is also moved in the same direction in accordance with the movement of the discharging rollers 36B. As will be described later, a rear portion of the platen 22 is movable in the upward and downward direction 7.

On rear parts of right and left end portions of the platen 22, there are respectively provided mount portions 22B on which first spring holders 27 described below are respectively mountable. Each of the first spring holders 27 integrally includes: a holder portion 27A disposed on a lower side of the mount portions 22B; a pair of front and rear mount pieces 27B each projected upward from a corresponding one of front and rear end portions of the holder portion 27A toward a corresponding one of the mount portions 22B; and hook claws 27C respectively provided on distal end portions of the mount pieces 27B so as to be respectively caught on the mount portions 22B. Each first spring holder 27 is moved in the upward and downward direction 7 relative to the platen 22, with a position at which the hook claws 27C are caught on the mount portions 22B as a lower limit. A first spring 28 is disposed between the holder portion 27A of the first spring holder 27 and the mount portions 22B of the platen 22. This first spring 28 urges the mount portions 22B upward relative to the holder portion 27A. As will be described later, the holder portion 27A is supported by a corresponding one of the linkage plates 50, whereby the rear portion of the platen 22 is supported by the first spring holders 27 in a state in which the rear portion of the platen 22 is urged upward by the first spring 28. As will be described later, when the linkage plate 50 has been moved by the user so as to be disengaged from the first spring holder 27, the rear portion of the platen 22 is lowered by its own weight together with a front portion of the platen 22, resulting in that the platen 22 is supported by the first frames 25. A distance of this movement of the platen 22 is set to be generally equal to a thickness of the disc tray 48 (3 mm, for example). Accordingly, where the platen 22 is in its lowered posture, the disc tray 48 inserted by the user can be smoothly guided toward the second conveying path 33 in the rearward direction. Further, in the case of the image recording, the disc tray 48 can be conveyed frontward by the convey-roller pair 35 and the discharging-roller pair 36.

<Switch-back-roller Pair 37>

As shown in FIG. 2, the switch-back-roller pair 37 disposed on a front side of the platen 22 is constituted by an upper pinch roller 37A and the lower switch-back rollers 37B. The upper pinch roller 37A is, for example, supported by the first frames 25 so as to be rotated about a central axis of the pinch roller 37A. It is noted that the illustration of the pinch roller 37A is omitted in FIGS. 3 and 4. The lower switch-back rollers 37B are supported by the linkage plates 50 which will be described below so as to be rotated about a central axis of the lower switch-back rollers 37B by the above-described drive portion. Further, the switch-back rollers 37B are supported by the linkage plates 50 which will be described below so as to be movable in the upward and downward direction 7 between (i) a contact posture thereof in which the switch-back rollers 37B are held in contact with the upper pinch roller 37A and (ii) a distant posture thereof in which the switch-back rollers 37B are located on a lower side of the rollers 37B taking the contact posture. A distance of the movement of the switch-back rollers 37B is set such that a distance between the switch-back rollers 37B and the pinch roller 37A which are spaced from each other is greater than the thickness of the disc tray 48 (3 mm, for example).

The support shaft 37C of the switch-back rollers 37B is inserted through the elongate holes 25B of the respective first frames 25, and one end of each of a pair of right and left torsion coil springs 63 shown in FIG. 4 is held in contact with a corresponding one of opposite end portions of the support shaft 37C. Each of the torsion coil springs 63 is supported at a central portion and the other end thereof by a corresponding one of the first frames 25 so as to urge the support shaft 37C upward by the above-described one end. The support shaft 37C is urged upward by the torsion coil springs 63, whereby the switch-back rollers 37B are kept pressed and held in contact with the pinch roller 37A. When receiving the drive power of the conveyance motor 113 in this state, the switch-back rollers 37B are rotated, and the pinch roller 37A is also rotated accordingly. In the case of one-side recording, the switch-back rollers 37B convey the recording sheet 19 frontward to discharge the recording sheet 19 onto the sheet-discharge portion 14A (see FIG. 2) provided on the sheet-supply cassette 14. In the case of two-side recording, the switch-back rollers 37B convey rearward the recording sheet 19 that has been temporarily conveyed frontward, to convey the recording sheet 19 into the return conveying path 34. The recording sheet 19 having entered into the return conveying path 34 is conveyed from the first conveying path 32 to the second conveying path 33 while being turned upside down. The recording sheet 19 passes through a position on the platen 22, during which the image is recorded on a back face of the recording sheet 19.

<Tray Guide 45>

As shown in FIG. 3, the tray guide 45 is formed to have a plate shape whose thickness direction coincides with the upward and downward direction 7, and the tray guide 45 is disposed on a front side of the switch-back rollers 37B. The pair of front and rear support projections 46 are projected from each of right and left side faces of the tray guide 45. The support projections 46 respectively pass through the above-described guide openings 71, 72 formed in the respective second frames 70. A front end portion 45A of the tray guide 45 is exposed outward from the opening 17 formed in the printer casing 11 (see FIG. 1A). When the front end portion 45A of the tray guide 45 is pressed down by the user, the support projections 46 are respectively moved from the straight portions 71A to the inclined portions 71B, whereby the lock of the tray guide 45 in the frontward and rearward direction 8 by the second frames 70 is released. When the tray guide 45 has been pulled out frontward by the user, the disc tray 48 can be placed on the upper face of the tray guide 45. Further, the tray guide 45 is connected to the linkage plates 50 described below, and thus the tray guide 45 has a function for moving the linkage plates 50 in the frontward and rearward direction 8.

Though not shown in FIG. 3, the printing section 15 is equipped with an optical sensor 118 (see FIG. 11) for sensing that the tray guide 45 has been operated by the user. The optical sensor 118 has the same construction as that of the optical sensor 68, and thus an explanation thereof is omitted. Near the tray guide 45 is provided a detector, not shown, that moves toward and away from the optical sensor 118 in accordance with a change of the posture of the front end portion 45A of the tray guide 45. The optical sensor 118 is connected to the controller 100 (see FIG. 11), and the controller 100 judges whether or not the tray guide 45 has been pressed down to perform the label recording on the basis of the change of the level of the sensor signal outputted from the optical sensor 118, e.g., the change of the signal level from the LOW level to the HIGH level.

<Linkage Plates 50>

As shown in FIG. 4, the linkage plates 50 respectively include right and left base portions 51 each having a plate shape whose thickness direction coincides with the rightward and leftward direction 9. Each of the base portions 51 is disposed between the platen 22 and a corresponding one of the first frames 25 in the rightward and leftward direction 9. Each base portion 51 is supported by the corresponding first frame 25 so as to be movable in the frontward and rearward direction 8. Each base portion 51 has a front end portion connected to the tray guide 45, whereby the base portion 51 is movable in the frontward and rearward direction 8 between (i) an initial posture shown in FIG. 5A in which the base portion 51 is located on a rear side and (ii) an expanded posture shown in FIG. 5B in which the base portion 51 is located on a front side of the base portion 51 taking the initial posture. In the present embodiment, since the tray guide 45 and the linkage plates 50 are connected to each other, the linkage plates 50 are changed or moved from the initial posture to the expanded posture in accordance that the tray guide 45 is pulled out by the user.

Figure 5A:
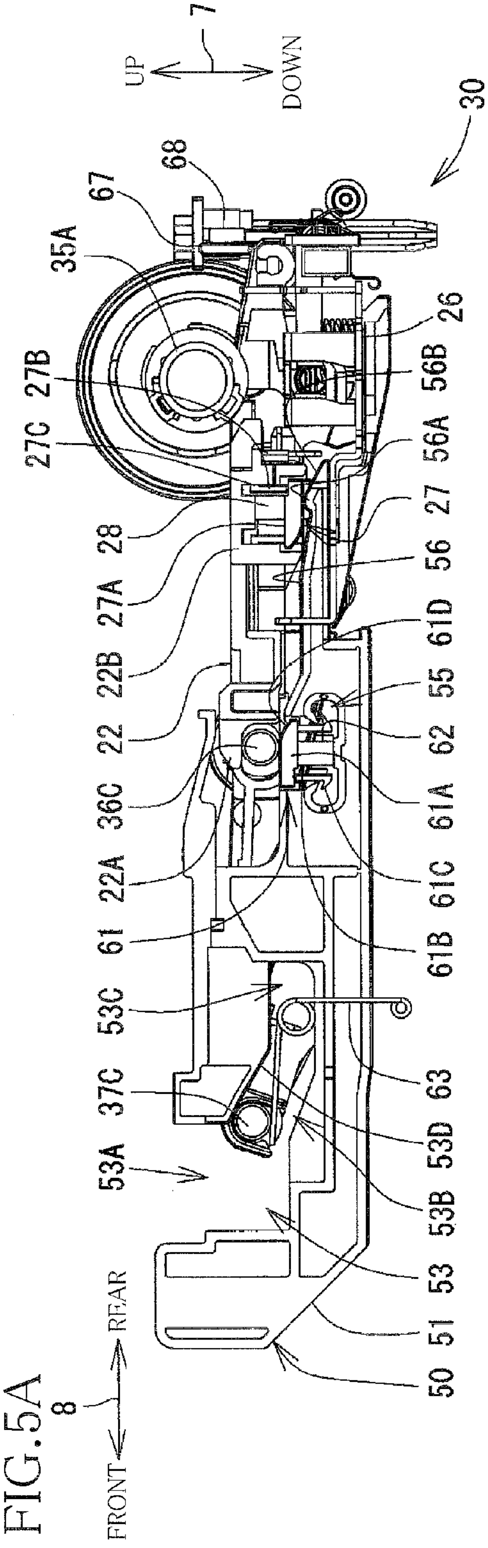
Figure 5B:
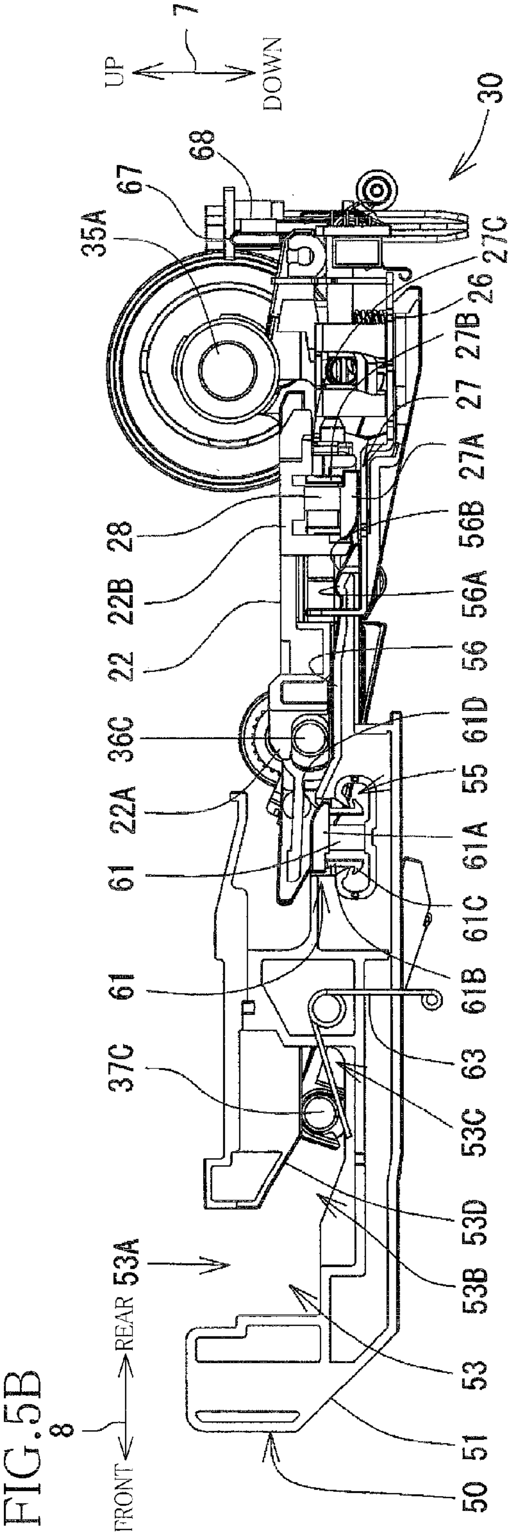

As shown in FIGS. 4, 5A and 5B, front portions of the right and left base portions 51 respectively have guide openings 53 through which the opposite end portions of the support shaft 37C of the switch-back rollers 37B in the rightward and leftward direction 9 are respectively inserted. Each of the guide openings 53 includes: an opening portion 53A opening upward; an inclined portion 53B formed on a rear side of the opening portion 53A; and a straight portion 53C formed on a rear side of the inclined portion 53B. The inclined portion 53B has an upper outer circumferential face formed by an inclined face 53D which is inclined downward toward a left side. The inclined face 53D is, for example, formed by one or a plurality of flat faces and/or curved faces. In the present embodiment, the inclined face 53D is generally formed by one flat face. The straight portion 53C extends straight from the inclined portion 53B toward the rear side thereof. As shown in FIG. 5A, the guide opening 53 is formed at a position at which the switch-back rollers 37B are located on a front end portion of the inclined portion 53B where the linkage plates 50 are in the rear-side initial posture. Where the linkage plates 50 are in its rear-side initial posture, the switch-back rollers 37B is pressed onto the pinch roller 37A and the inclined face 53D located thereover by being urged upward by the above-described torsion coil springs 63. When the linkage plates 50 are moved frontward together with the tray guide 45 from the position of the rear-side initial posture thereof, the switch-back rollers 37B pressed onto the inclined face 53D by the torsion coil springs 63 are pressed down while sliding over the inclined face 53D and reach the straight portion 53C as shown in FIG. 5B. That is, the switch-back rollers 37B are changed from the contact posture to the distant posture.

On rear portions of the base portions 51, there are respectively formed dovetail grooves 55 each having an inverted T shape opening upward. Where the linkage plates 50 are in the initial posture, the dovetail grooves 55 are located just under the support shaft 36C of the discharging rollers 36B. The dovetail grooves 55 respectively accommodate therein second spring holders 61. Each of the second spring holders 61 integrally includes: a holder portion 61A disposed in an upper portion of the dovetail groove 55; front and rear mount pieces 61B projected downward respectively from front and rear end portions of the holder portion 61A; and hook claws 61C respectively provided on lower end portions of the respective mount pieces 61B so as to be hooked on a wall defining a lower portion of the dovetail groove 55. The second spring holder 61 is moved in the upward and downward direction 7 relative to the base portion 51, with the position at which the hook claws 61C are hooked on the wall defining the dovetail groove 55 as an upper limit. The second spring 62 is disposed between the holder portion 61A disposed on an upper side of the dovetail groove 55 and an inner bottom face (i.e., a lower face) of the dovetail groove 55. This second spring 62 urges the second spring holder 61 upward relative to the base portion 51. As shown in FIG. 5A, where the linkage plates 50 are in the initial posture, the support shaft 36C of the discharging rollers 36B is held in contact with an upper face of the holder portion 61A of the second spring holder 61, and the second spring holder 61 is located below the upper limit. In this state, the second spring 62 urges the discharging rollers 36B upward via the second spring holder 61, causing the discharging rollers 36B to take the contact posture in which the discharging rollers 36B are held in contact with the pinch roller 36A.

As described above, the second spring holders 61 are respectively mounted on the base portions 51 of the respective linkage plates 50, and thus the second spring holders 61 are slid in the frontward and rearward direction 8 integrally with the base portions 51. On a rear part of the holder portion 61A of each second spring holders 61, there is formed an inclined face 61D which is inclined downward toward a rear side thereof. When the linkage plates 50 being in the initial posture are moved frontward by the user, the support shaft 36C of the discharging rollers 36B is slid over the inclined face 61D and as shown in FIG. 5B is disengaged from the second spring holders 61. The support shaft 36C not supported by the second spring holders 61 is lowered by its own weight and then supported by the first frames 25.

The linkage plates 50 respectively include right and left support pieces 56 each extending rearward from a rear end of a corresponding one of the base portions 51. As shown in FIG. 5A, on the rear end portion of each support piece 56, there is provided a support protrusion 56A which is held in contact with a lower face of the holder portion 27A of a corresponding one of first spring holders 27 mounted on the platen 22 where the linkage plates 50 are in the initial posture. That is, the linkage plates 50 support the rear portion of the platen 22 by the support pieces 56 via the respective first spring holders 27. An inclined face 56B is provided on a rear portion of the support protrusion 56A of each support piece 56. This inclined face 56B is inclined downward toward a rear side thereof. When the linkage plates 50 are moved frontward from the position of the initial posture, each first spring holder 27 is lowered while sliding over the inclined face 56B and as shown in FIG. 5B is disengaged from the support protrusion 56A. As a result, the platen 22 is lowered by its own weight.

Figure 11:
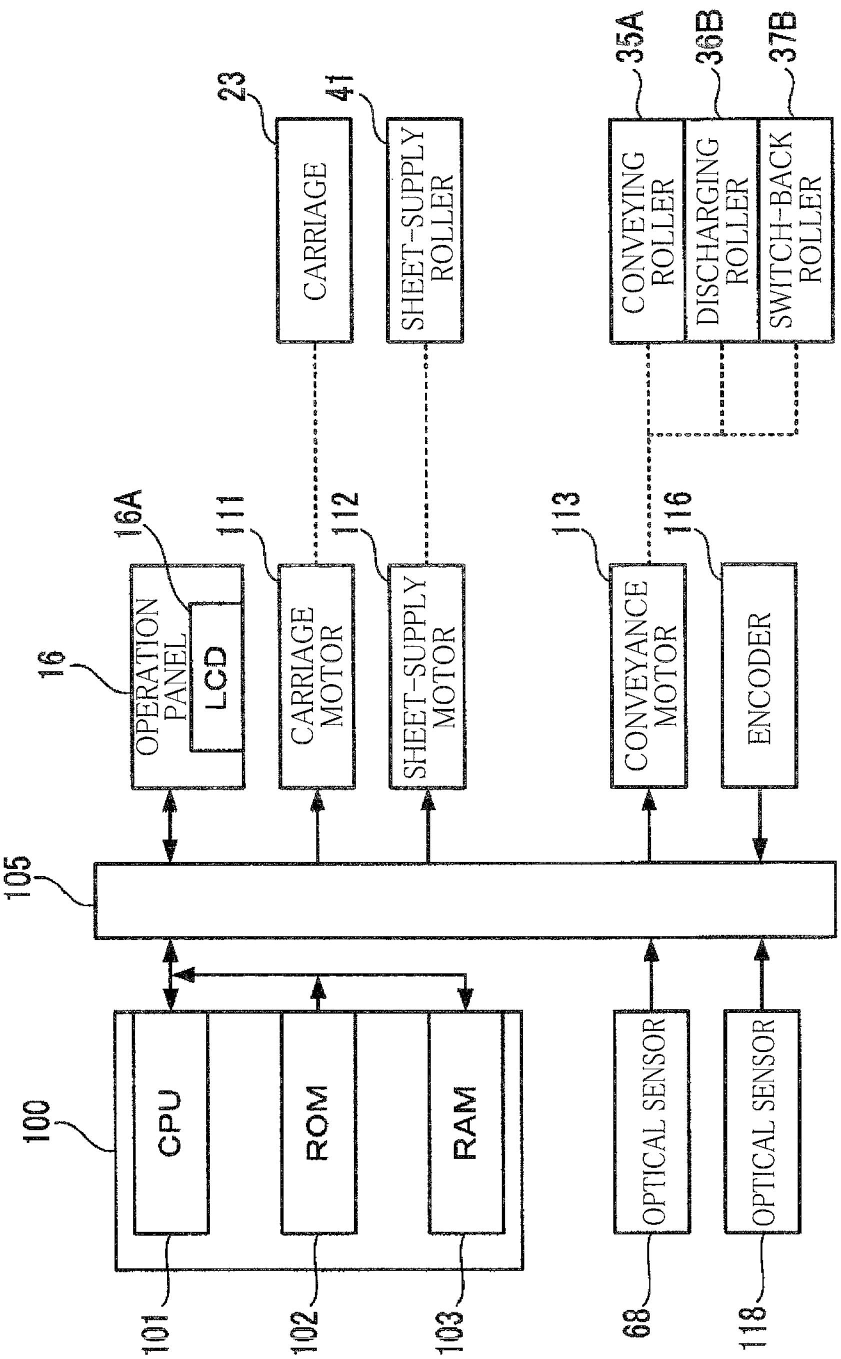
FIG. 11 is a block diagram showing a configuration of a controller 100.

There will be next explained a configuration of the controller 100 with reference to FIG. 11.

As shown in FIG. 11, the controller 100 mainly includes a CPU 101, a ROM 102, and a RAM 103. The CPU 101, the ROM 102, and the RAM 103 are connected to one another via a bus line. The controller 100 is connected to the operation panel 16, the carriage motor 111, the sheet-supply motor 112, the conveyance motor 113, an encoder 116, the optical sensor 68, and the optical sensor 118 via an input and output port 105.

The CPU 101 is configured to control various functions of the MFP 10 in accordance with data values and programs stored in the ROM 102 and the RAM 103 and control various members connected to the input and output port 105. The ROM 102 is an unrewritable memory storing therein control programs and so on to be executed by the MFP 10. The RAM 103 is a rewritable volatile memory and temporarily stores various data when the MFP 10 performs various operations.

Figure 12:
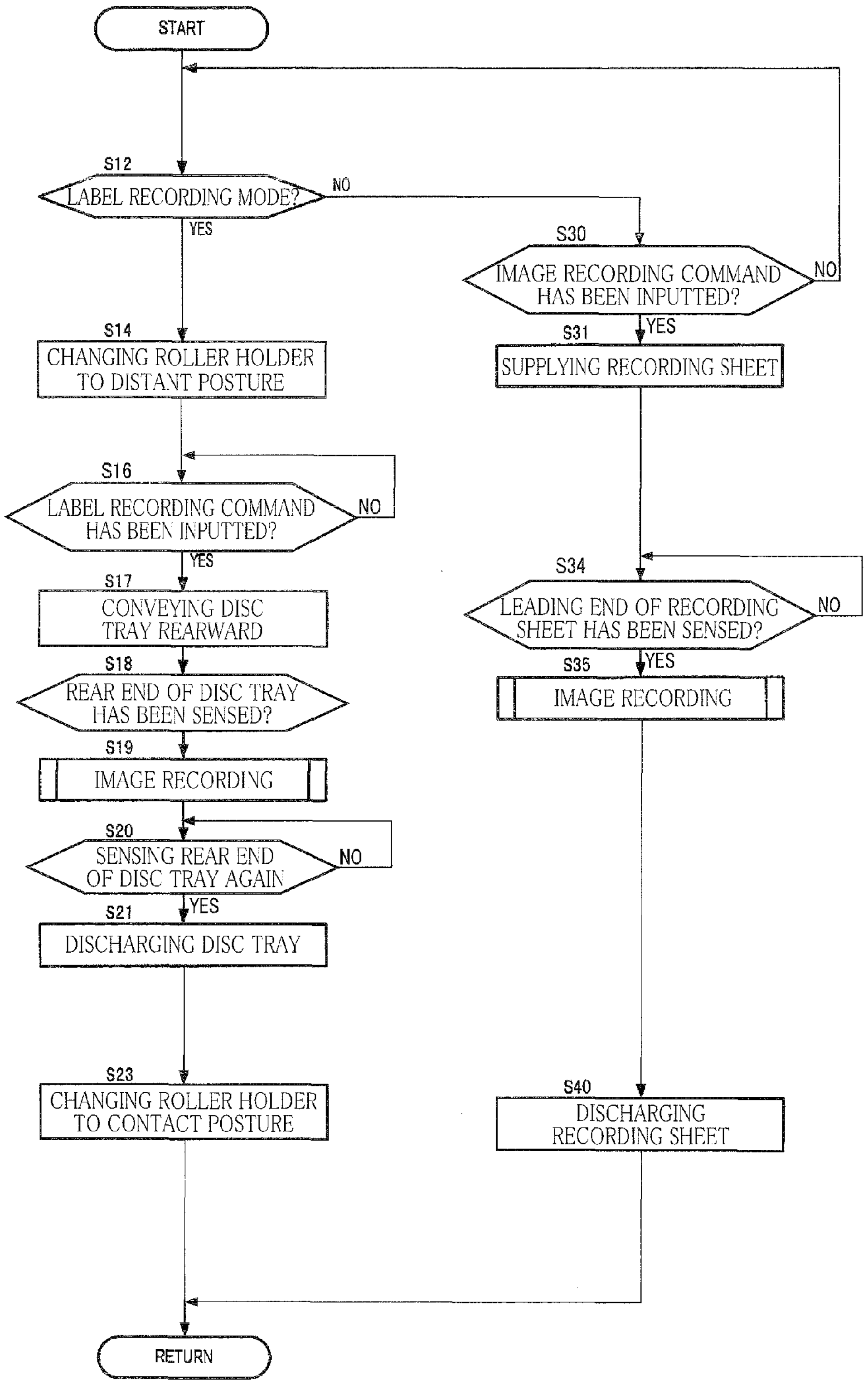
FIG. 12 is a flow-chart showing a procedure of a processing for sensing conveyed positions of the disc tray 48 and a recording sheet 19 when image recording is performed.

There will be next explained, with reference to a flow-chart shown in FIG. 12, (a) a processing executed by the CPU 101 for sensing the conveyed positions of the disc tray 48 and the recording sheet 19 and so on in the image recording and (b) operations of the members of the MFP 10.

Initially in S12, the CPU 101 judges whether the recording mode is the label recording mode or not. When the tray guide 45 has been pulled out frontward by the user and is ready for the label recording, the detector, not shown, is retracted from a sensing portion of the optical sensor 118, whereby a level of an output signal of the optical sensor 118 is changed from a LOW level to a HIGH level. The CPU 101 judges that the tray guide 45 has been pulled out on the basis of this change and then changes the recording mode to the label recording mode.

When the tray guide 45 has been pulled out frontward by the user, and the linkage plates 50 are changed from the initial posture to the expanded posture, the platen 22, the discharging rollers 36B, and the switch-back rollers 37B are lowered, causing the second conveying path 33 to be expanded in the upward and downward direction 7. It is noted that the expanded posture of the linkage plates 50 is a posture for the image recording on the disc medium such as a CD and a DVD.

Then in S14, the CPU 101 changes the roller holder 74 to the distant posture to move the pressing rollers 35B away from the conveying roller 35A. Then, where a label recording command has been inputted from the operation panel 16 or the PC (S16: YES), the CPU 101 in S17 executes a processing for conveying the disc tray 48 rearward. After the second conveying path 33 has been expanded in the upward and downward direction 7, the user inserts the disc tray 48 into the second conveying path 33 from the opening 17 in a state in which the disc tray 48 is supported by the tray guide 45. The user inputs the label recording command after the disc tray 48 has been inserted to a position shown in FIGS. 9B and 10A. Where the label recording command has been inputted by the user, the CPU 101 controls the conveyance motor 113 to rotate the conveying roller 35A and the discharging rollers 36B reversely. As a result, the disc tray 48 is conveyed rearward.

Figure 10B:
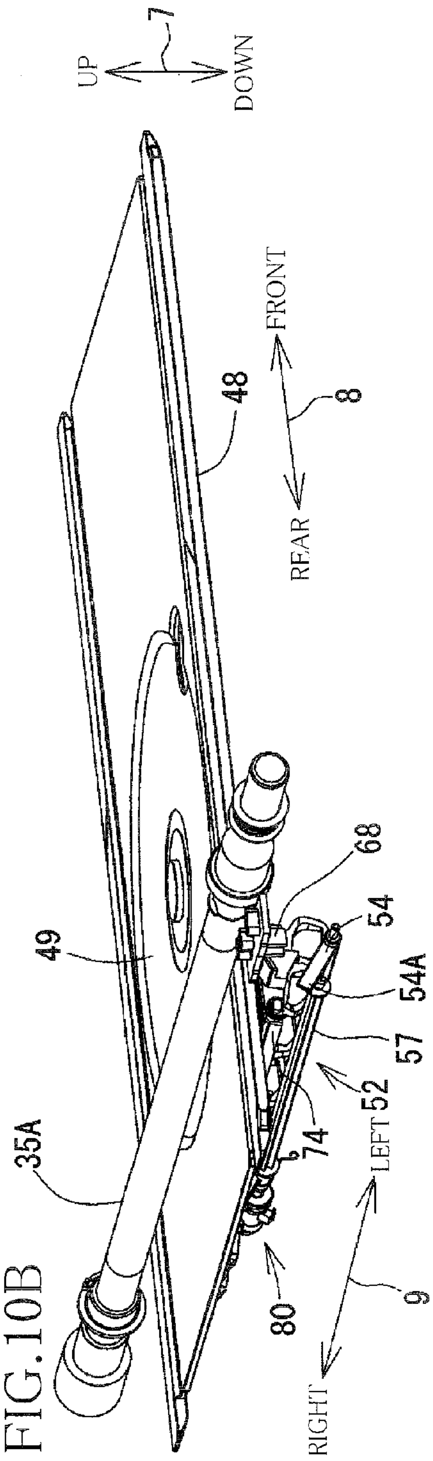

As shown in FIG. 10B, when the disc tray 48 has been conveyed rearward, a rear end portion of the disc tray 48 pushes down rearward the rotator 67 being inclined frontward. Thus, the detector 54 retracted frontward from the sensing portion 68A enters into the sensing portion 68A and then exits rearward. In this movement, a level of the output signal of the optical sensor 68 is changed from the HIGH level to the LOW level and immediately thereafter changed to the HIGH level again. Where the label recording command has been inputted and where the signal level of the optical sensor has been changed from the HIGH level to the LOW level, the CPU 101 in S18 senses that the rear end portion of the disc tray 48 has passed through the rotator 67.

Where the rear end portion of the disc tray 48 has been sensed in S18, the CPU 101 in S19 conveys the disc tray 48 to a position at which the image recording can be performed on the label face of the disc medium and then performs the image recording on the label face of the disc medium while forwardly rotating the conveying roller 35A to intermittently convey the disc tray 48 frontward.

In the image recording, the CPU 101 in S20 senses the rear end of the disc tray 48 again on the basis of the output signal of the optical sensor 68. When the disc tray 48 has been conveyed frontward, the rear end portion of the disc tray 48 passes through the rotator 67, and the rotator 67 returns to the above-described posture (see FIG. 9B) thereof in which the rotator 67 is inclined frontward. In this operation, the detector 54 retracted rearward from the sensing portion 68A enters into the sensing portion 68A and then exits frontward. In this movement, the level of the output signal of the optical sensor 68 is changed from the HIGH level to the LOW level and immediately thereafter changed to the HIGH level again. When the signal level of the optical sensor has been changed from the HIGH level to the LOW level again in the image recording, the CPU 101 senses that the rear end portion of the disc tray 48 has passed through the rotator 67 again. In S21, when the image recording processing has been finished, the conveying roller 35A and so on are continuously rotated to discharge the disc tray 48 frontward. Then in S23, the CPU 101 changes the roller holder 74 to the contact posture to bring the pressing rollers 35B into contact with the conveying roller 35A, and the CPU 101 finishes this processing.

On the other hand, where the CPU 101 has judged in S12 that the recording mode is not the label recording mode, the CPU 101 goes to S30. Where the CPU 101 has judged that an image recording command has been inputted together with the image data from the PC, for example (S30: YES), the recording mode is changed to the normal recording mode, and the recording sheet 19 is supplied from the sheet-supply cassette 14 in S31.

Then in S34, on the basis of the output signal of the optical sensor 68, the CPU 101 senses a position of a leading end of the recording sheet 19 in the second conveying path 33. When the leading end of the recording sheet 19 has pushed down the rotator 67 during the conveyance of the recording sheet 19, the output signal of the optical sensor 68 is changed from the LOW level to the HIGH level. On the basis of this change of the signal level, the CPU 101 senses that the leading end of the recording sheet 19 has passed through the rotator 67. Where the CPU 101 has sensed the leading end of the recording sheet 19 (S34: YES), the CPU 101 in S35 starts the image recording on the recording sheet 19 after the recording sheet 19 has been conveyed to the position for the image recording. It is noted that when the leading end of the recording sheet 19 has reached a position at which the convey-roller pair 35 can nip and convey the recording sheet 19, the sheet-supply roller 41 stops supplying the recording sheet 19.

When the image recording has been finished, the recording sheet 10 is discharged in S40, and thereafter the CPU 101 executes S23 and finished this processing.

<Effects of First Embodiment>

As described above, the sensor holder 92 and the inner guide member 32A2 are independently of each other, in other words, the sensor holder 92 is constructed as another member from the inner guide member 32A2. Thus, it is possible to employ a layout in which the inner guide member 32A2 is disposed between the first frames 25 of the main frame 65, and the sensor holder 92 is attached or fastened to the outer face 98 of the first frame 25. Further, thanks to this layout, even if the inner guide member 32A2 is deformed or bent by a force applied during the conveyance of the recording medium, the deformation has no effect on the sensor holder 92. Thus, a positional displacement of the sensor holder 92 is not caused, whereby an accuracy of the sense of the sensor 68 supported by the sensor holder 92 is not lowered. Further, it is possible to secure the sensor holder 92 to the first frame 25 and the rail 66, whereby a strength of securing the sensor holder 92 is improved. Further, since the sensor holder 92 is disposed outside the first frame 25, a length of the inner guide member 32A2 can be made generally equal to a length of the conveying path 31.

It is noted that, in the present first embodiment, the optical sensor 68 is used as one example of the sensor, but instead of the optical sensor 68, there may be employed another type of sensor such as a reflective sensor, a magnetic sensor, and a contact sensor. Further, in the above-described embodiment, the MFP 10 has the return conveying path 34, but the present invention may be applied to a construction not having the return conveying path 34.

There will be next explained an MFP 210 as a second embodiment of the present invention. It is noted that the same reference numerals as used in the first embodiment are used to designate the corresponding elements of this second embodiment, and an explanation of which is dispensed with.

There is conventionally known an image recording apparatus which is provided with a cover for opening or exposing a conveying path in order to remove a recording sheet jammed in the conveying path. In this type of image recording apparatus, when the recording sheet is conveyed with the cover being opened, the recording sheet may come flying out to the outside of the apparatus or may be jammed in the conveying path. Thus, the image recording apparatus is equipped with a sensor for sensing an open or closed state of the cover, i.e., for sensing whether the cover is opened or closed.

However, if a plurality of sensors are provided for all objects to be sensed in order to sense all of the objects (e.g., a conveyed position of the recording sheet, the open or closed state of the cover, and so on), an increase in the number of components leads to a higher component cost and a higher assembling cost required for a sensor mounting work and a wiring work. Such a construction needs to find spaces in the apparatus for mounting the sensors and for routing lead wires, which complicates a layout of wirings and inner mechanisms. In particular, in a compact image recording apparatus usually placed on a desk, a casing of the apparatus has to be made larger in order to secure spaces for mounting the sensors and for routing wirings, which hinders a downsize of the apparatus.

This second embodiment has been developed in view of the above-described situations, and it is an object of the second embodiment to provide an image recording apparatus achieving the effects of the above-described first embodiment and being capable of sensing a conveyed position of a recording medium and an open or closed state of a cover with a single sensor.

Figure 13:
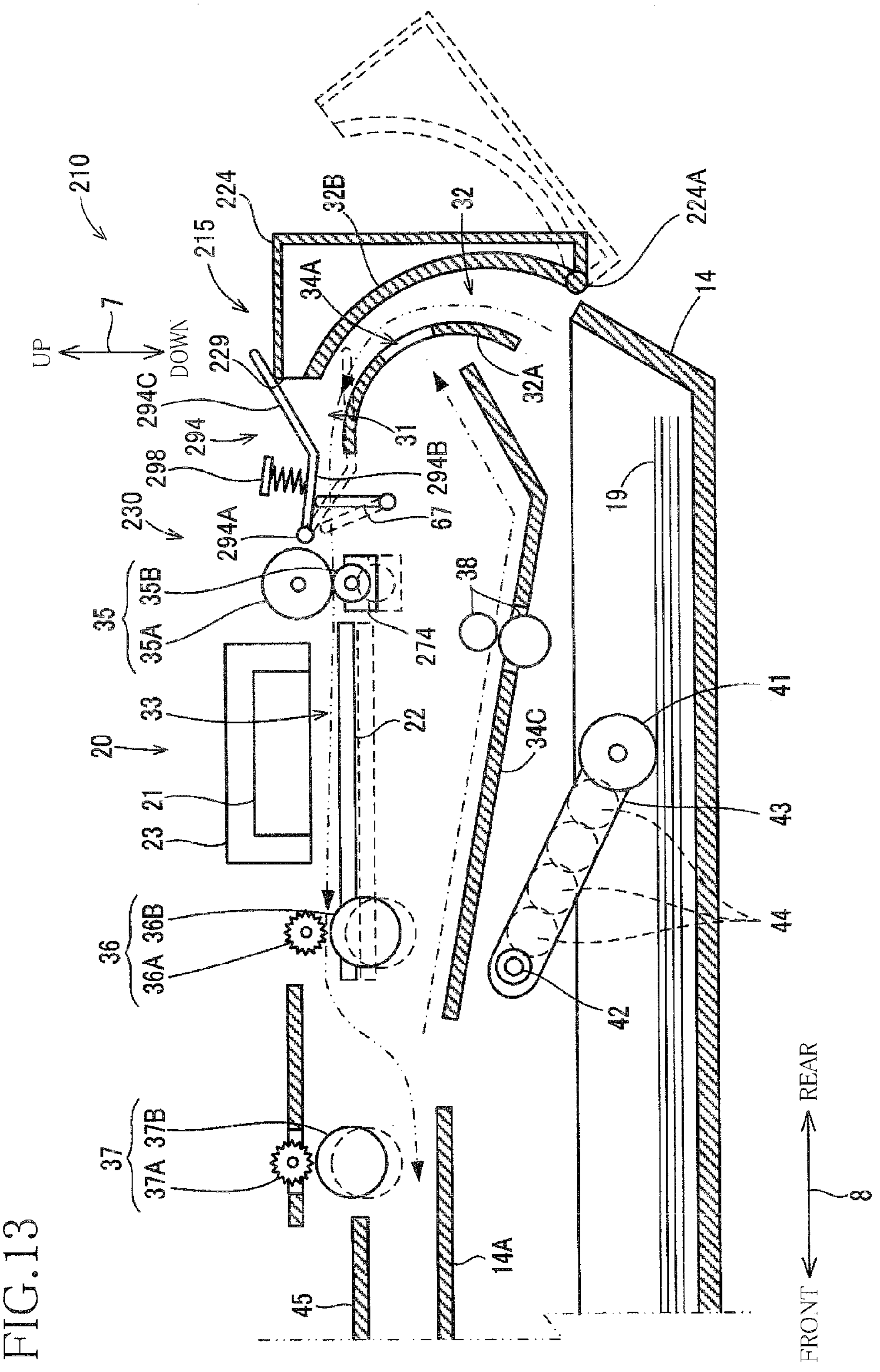
FIG. 13 is a cross-sectional view schematically showing a construction of a printing section 215 of an MFP 210 as a second embodiment of the present invention.
Figure 19:
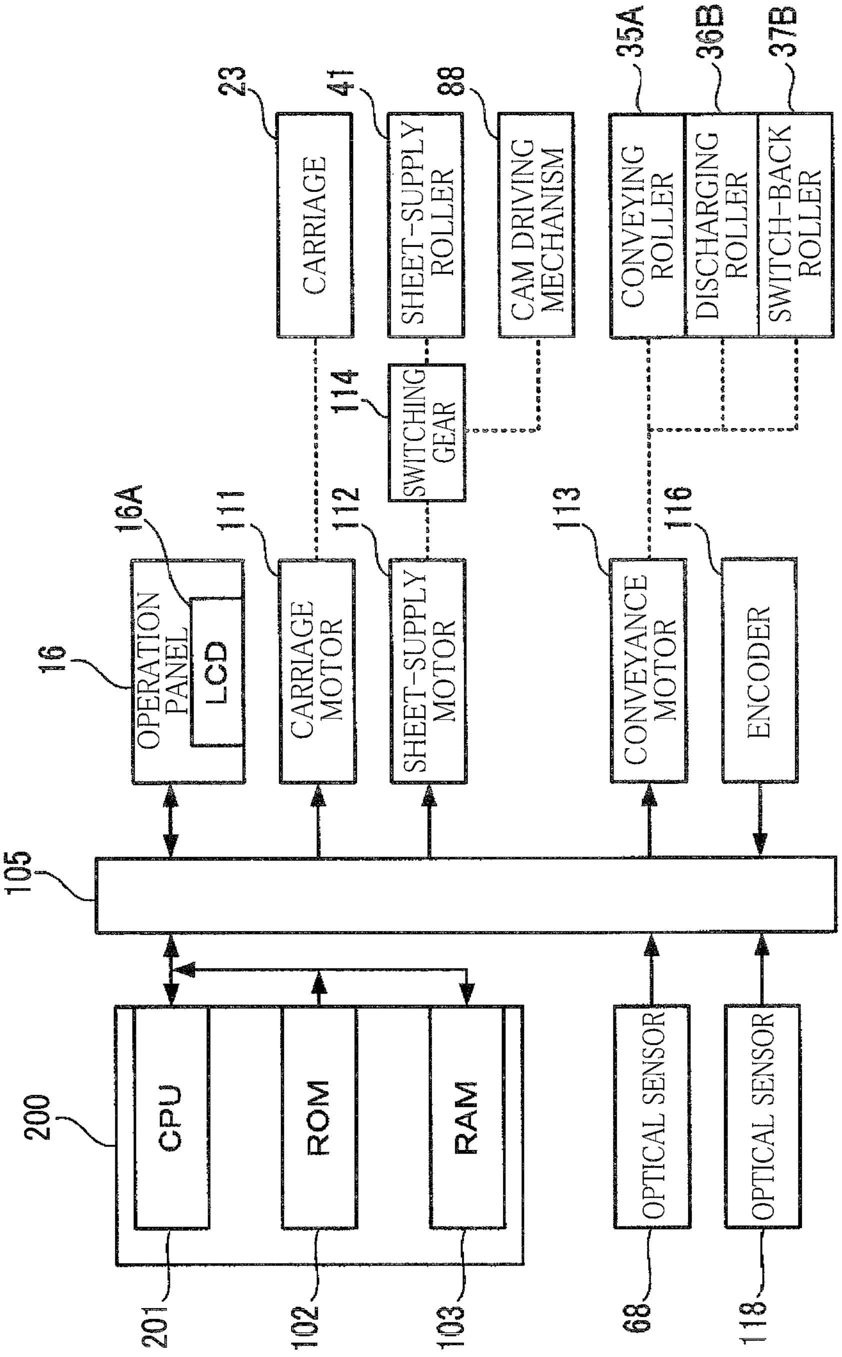
FIG. 19 is a block diagram showing a configuration of a controller 200 in a second embodiment.

As shown in FIG. 13, the MFP 210 as the second embodiment is provided with a cover 224 for opening and closing a rear portion of a printing section 215. A sensing mechanism 252 (see FIG. 14) of a conveying device 230 of the second embodiment can sense an open or closed state of the cover 224 and so on in addition to the conveyed positions of the recording sheet 19 and the disc tray 48. Further, the conveying device 230 includes a cam driving mechanism 88 (see FIG. 15) which is driven by the sheet-supply motor 112. In the present second embodiment, the MFP 210 includes a switching gear 114 (see FIG. 19) driven by the sheet-supply motor 112. By switching the drive-power transmitting paths of the switching gear 114, the drive power of the sheet-supply motor 112 is transmitted to one of the sheet-supply roller 41 and the cam driving mechanism 88 (see FIG. 15). Further, as will be described later, a controller 200 of the second embodiment senses the presence or absence of the recording medium, the conveyed position in the conveying path, a posture (a movement position) of a roller holder 274 which will be described below, and the open or closed state of the cover 224 which will be described below.

<Cover 224>

The cover 224 is provided on the rear portion of the printing section 215. A support shaft 224A is inserted through a lower end of the cover 224. The support shaft 224A is rotatably supported by a frame, not shown. The cover 224 is pivoted about the support shaft 224A between (i) a first posture indicated by solid lines in FIG. 13 for covering the rear portion (face) of the printing section 215 and (ii) a second posture indicated by broken lines in FIG. 13 in which the cover 224 is located on a rear side of the rear portion of the printing section 215 for exposing the inside of the printing section 215. The outer guide member 32B is provided on an inner face of the cover 224. The outer guide member 32B is constructed integrally with the cover 224. Accordingly, when the cover 224 is pivoted, the outer guide member 32B is also pivoted in the same direction as a pivotal direction of the cover 224. In the present embodiment, when the cover 224 is in the first posture, the outer guide member 32B is disposed so as to face an inner guide member 32A, whereby the first conveying path 32 is defined by the outer guide member 32B and the inner guide member 32A. On the other hand, when the cover 224 is changed from the first posture to the second posture, the outer guide member 32B is moved away from the inner guide member 32A to open the first conveying path 32.

A pressing portion 229 is provided on an upper end portion of the inner face of the cover 224. The pressing portion 229 is provided at a central portion of the cover 224 in the rightward and leftward direction 9 so as not to interfere with the recording sheet conveyed through the first conveying path 32. The pressing portion 229 presses up a second arm 294C of a sensor arm 294 which will be described below in a process in which the cover 224 is pivoted from the second posture to the first posture.

<Roller Holder 274>

Figure 14:
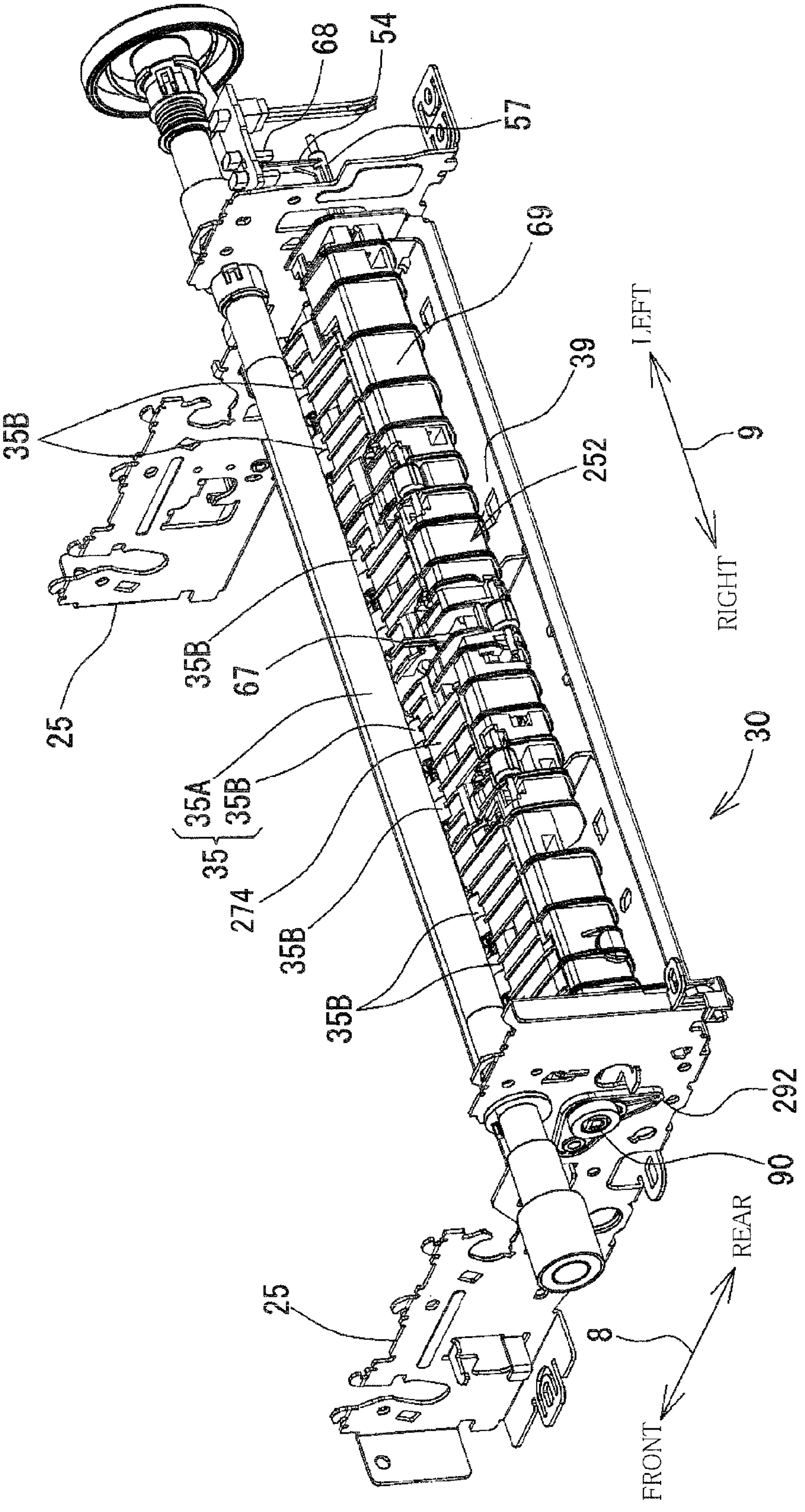
FIG. 14 is a perspective view showing a construction of a roller holder 74.
Figure 15:
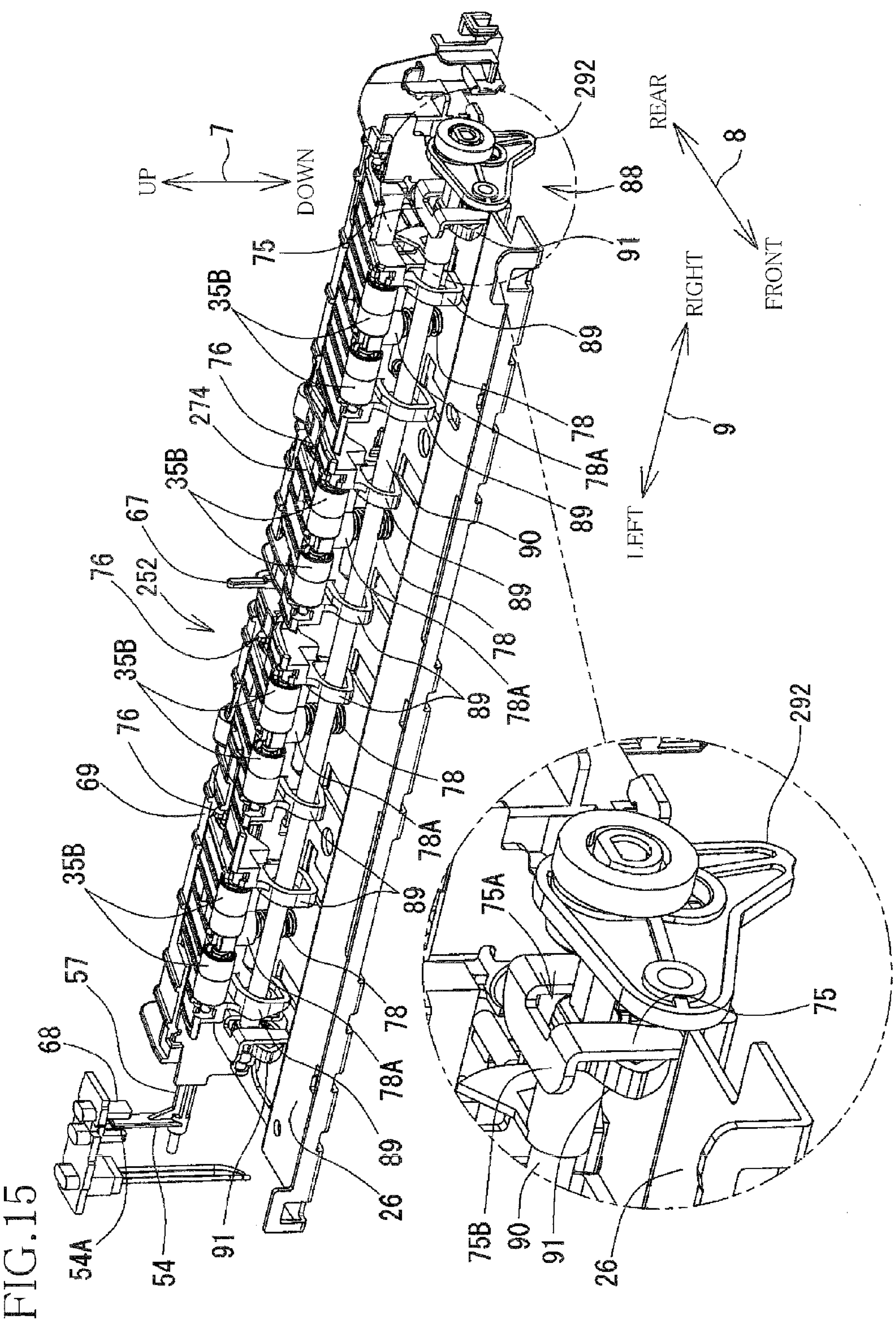
FIG. 15 is a perspective view showing a construction of a cam driving mechanism 88.

As shown in FIGS. 14 and 15, the roller holder 274 (as one example of a driven-roller support member) is provided slightly on a rear side of the convey-roller pair 35. The roller holder 274 is independent of the platen 22, in other words, the roller holder 274 is constructed as another member from the platen 22. The roller holder 274 has four blocks connected to one another in the rightward and leftward direction 9, so that the roller holder 74 has an elongated shape in the rightward and leftward direction 9 in its entirety. Each of the pressing rollers 35B is rotatably supported by a front upper end portion of a corresponding one of the blocks. In the present embodiment, the roller holder 274 supports the eight pressing rollers 35B arranged in a row in the rightward and leftward direction 9. A plurality of support shafts 76 (see FIG. 16) are provided on a rear upper end portion of the roller holder 274. These support shafts 76 are supported by the respective bearings 26B provided on the sub-frame 26 which will be described below. This construction allows the roller holder 274 to be pivoted about the support shafts 76. More specifically, the roller holder 274 is pivotable about the support shafts 76 between (i) a sixth posture in which the pressing rollers 35B are held in contact with the upper conveying roller 35A and (ii) a seventh posture in which the pressing rollers 35B is distant from the conveying roller 35A.

As shown in FIG. 15, the sub-frame 26 formed of the metal plate is provided under the roller holder 274. The sub-frame 26 is secured at its opposite ends to the first frames 25. The coil springs 78 are provided between the roller holder 274 and the sub-frame 26. It is noted that the illustration of the conveying roller 35A is omitted in FIG. 15. The coil springs 78 are provided near the pressing rollers 35B such that the direction in which the coil springs 78 are extended or contracted coincides with the upward and downward direction 7. Specifically, upper ends of the coil springs 78 are respectively accommodated in spring holders 78A provided on a back face (a lower face) of an upper wall of the roller holder 274, and lower ends of the coil springs 78 are mounted on the sub-frame 26. The coil springs 78 are provided between the roller holder 274 and the sub-frame 26 in a state in which the coil springs 78 are contracted in advance to apply a preset urging force to the conveying roller 35A. As a result, an upward urging force generated by extension movement of the coil springs is applied to the roller holder 274, causing the roller holder 274 to maintain the above-described sixth posture. The upward urging force of the coil springs 78 is applied to the pressing rollers 35B via the roller holder 274, whereby the pressing rollers 35B are held in pressing contact with the conveying roller 35A by the above-described urging force. It is noted that, when a front end portion of the roller holder 274 is lowered against the above-described urging force by the cam driving mechanism 88 which will be described below, the roller holder 274 is changed from the sixth posture to the seventh posture, so that the pressing rollers 35B are moved downward away from the conveying roller 35A.

Figure 16:
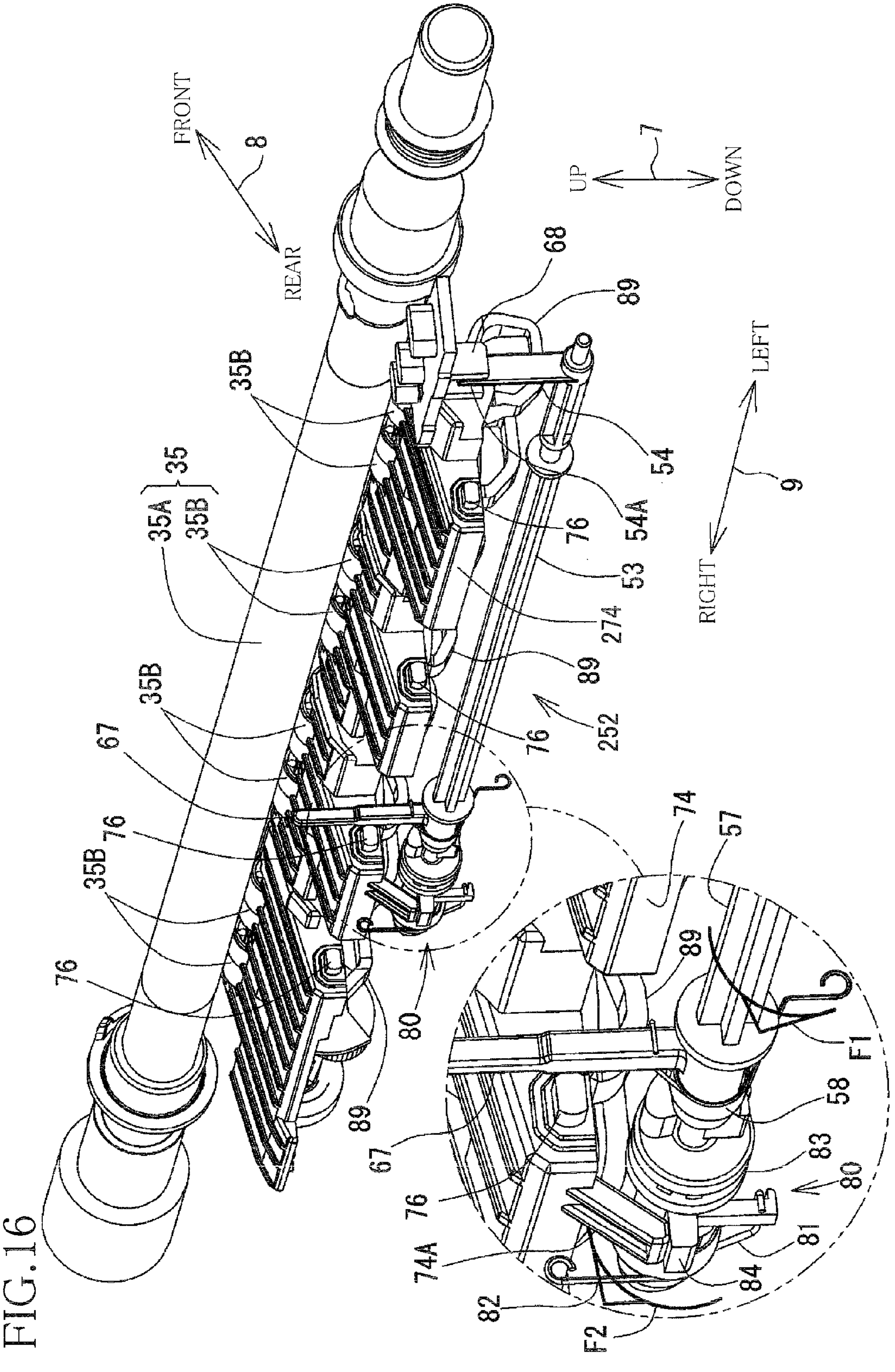
FIG. 16 is a perspective view showing a construction of a sensing mechanism 52.

As shown in FIG. 16, on a central part of a rear end portion of the roller holder 274, there is provided a stopper 74A projected slantly rearward and downward from the rear end portion. The stopper 74A is provided on a rear side of a rotational axis of the roller holder 274. The stopper 74A is engaged with the restraining member 81 which will be described below to restrain the pivotal movement of the restraining member 81.

<Sensing Mechanism 252>

The sensing mechanism 252 (as one example of a detecting portion) is configured to sense (a) the recording sheet 19 conveyed in the above-described normal recording mode, (b) the disc tray 48 in the above-described label recording mode, (c) the posture of the roller holder 274, and (d) the open or closed state of the cover 224. As shown in FIG. 14, this sensing mechanism 252 is provided on a rear side of the convey-roller pair 35 (i.e., on an upstream side of the convey-roller pair 35 in the direction in which the recording sheet 19 is conveyed in the image recording) and on a front side of the cover 224. The sensing mechanism 252 includes: a casing 69 supporting the roller holder 274 pivotably and accommodating components of the sensing mechanism 252; the optical sensor 68 provided on an outer (left) side of a left end portion of the casing 69; the sensor arm 294 (see FIG. 13, as one example of a first linkage mechanism) interlocked with opening and closing operations of the cover 224; and a coil spring 298 (FIG. 13). The casing 69 is elongated in the rightward and leftward direction 9, and a plurality of the claws, not shown, provided on a front end of the casing 69 are engaged with the sub-frame 26, thereby securing the casing 69 to the sub-frame 26. As shown in FIG. 16, in the casing 69 is rotatably supported the rotation shaft 57 extending from the central portion of the sub-frame 26 in the rightward and leftward direction 9 to an outside of the left end portion. To the rotation shaft 57 is fixed the rotator 67 having the arm shape (as one example of the first detector). A slit is formed in a central portion of the casing 69 in the rightward and leftward direction 9. The rotator 67 is projected upward from the rotation shaft 57 through the slit and, as shown in FIG. 14, exposed outward from the inside of the casing 69. The detector 54 (as one example of the second detector) is provided on the left end of the rotation shaft 57. The detector 54 is projected in the same direction as the rotator 67. The rotator 67 and the detector 54 are fixed to the rotation shaft 57. Accordingly, when the force has been applied to the rotator 67 in its rotational direction, the detector 54 is rotated with the rotator 67 in the direction in which the rotator 67 is rotated.

<Rotation Restraining Mechanism 80>

As shown in FIG. 16, the torsion coil spring 58 is mounted on the rotator 67. The spring 58 applies to the rotator 67 the urging force F1 for pivoting the rotator 67 rearward from the posture thereof shown in FIG. 16. On the right end portion of the rotation shaft 57, there is mounted the rotation restraining mechanism 80 (one example of a second linkage mechanism) for restraining or inhibiting the pivotal movement of the rotator 67 caused by the urging force F1. The rotation restraining mechanism 80 includes: the joint 83 connected to the right end portion of the rotation shaft 57; the restraining member 81 fixed to the joint 83; and the torsion coil spring 82 mounted on the restraining member 81. The joint 83 is connected to the right end portion of the rotation shaft 57 so as to be rotatable about the axis of the rotation shaft 57. This joint 83 is configured to allow the rotator 67 to be pivoted frontward from its posture shown in FIG. 16 and to restrain or inhibit the rotator 67 from being pivoted rearward.

Figure 17A:
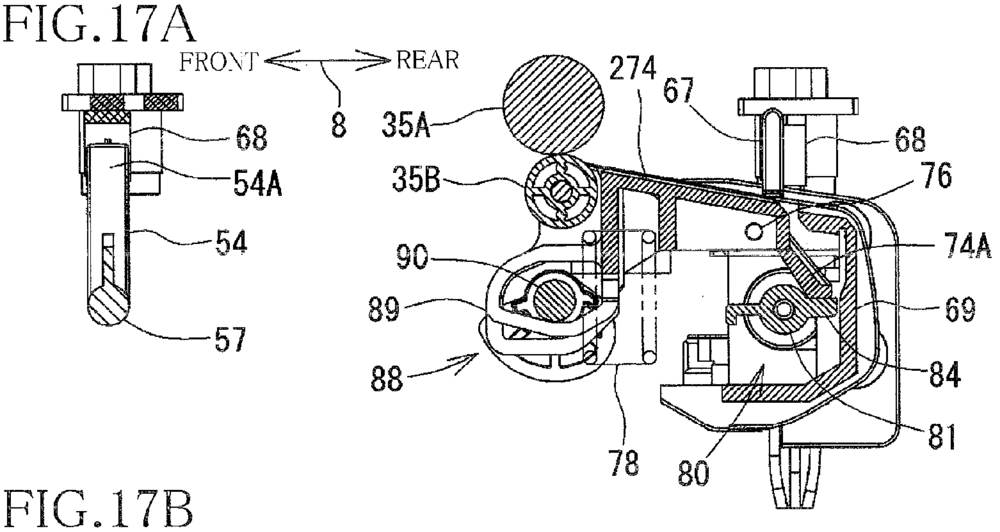
FIGS. 17A, 17B, and 17C are cross-sectional views for explaining operations of the roller holder 74, a rotator 67, and a detector 54 when label recording is performed.
Figure 17B:
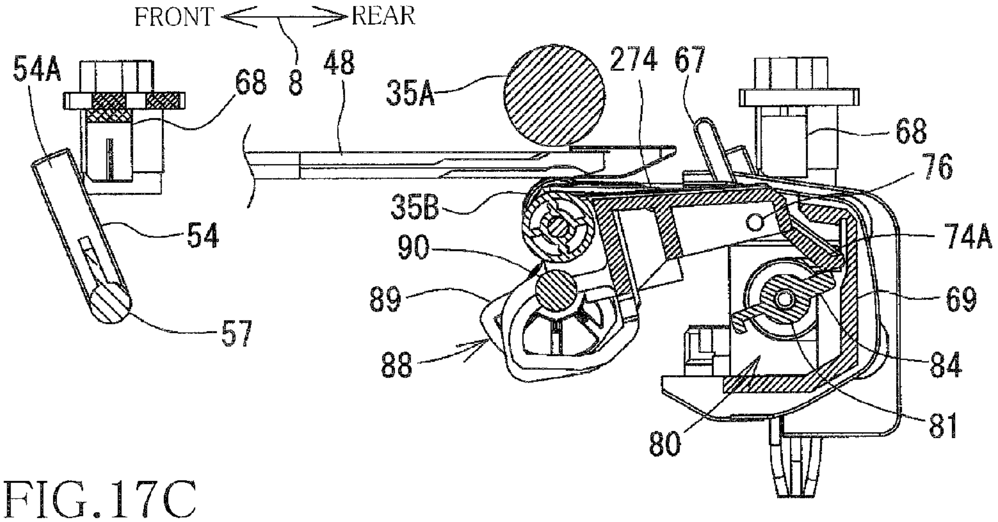

The restraining member 81 has a projection 84 projected in a direction perpendicular to the rotation shaft 57. The projection 84 is projected rearward from the restraining member 81. The spring 82 applies to the restraining member 81 the urging force F2 that is greater than the urging force generated by the spring 58. Specifically, the spring 82 applies to the restraining member 81 the urging force F2 (>F1) for pivoting the projection 84 upward from the posture shown in FIG. 16. That is, the urging force F2 is applied in the direction opposite to the direction in which the urging force F1 is applied. The urging force F2 is considerably less than the urging force of each coil spring 78. The above-described stopper 74A provided on the rear end of the roller holder 274 is held in contact with an upper face of the projection 84. These constructions enable the forces applied to the members to be balanced with one another, thereby maintaining the rotator 67 in the posture shown in FIGS. 16 and 17A, i.e., a fifth posture in which the rotator 67 is projected upward from the rotation shaft 57 so as to intersect the second conveying path 33. On the other hand, when the can driving mechanism 88 which will be described below has changed or moved the front end portion of the roller holder 274 from the sixth posture shown in FIG. 17A to the seventh posture shown in FIG. 17B, the stopper 74A located on a rear side of the support shafts 76 about which the roller holder 274 is rotated is moved upward. As a result, the restraining member 81 receives the urging force F2 and is pivoted in a direction in which the urging force F2 urges the restraining member 81. Interlocking with this pivotal movement, the rotator 67 is inclined frontward by receiving the pivotal force from the joint 83, and as shown in FIG. 17B, the detector 54 is retracted from the sensing portion of the sensor 68. It is noted that an amount of this pivotal movement of the rotator 67 is so small that the rotator 67 is kept intersecting the second conveying path 33.

<Optical Sensor 68>

The optical sensor 68 is the photo interrupter of the transmission type having the light emitting element and the light receiving element disposed so as to face each other. When the light receiving element has received light emitted from the light emitting element, the optical sensor 68 outputs an electric signal (a sensor signal) in accordance with an amount (an intensity) of the received light. The light path extending from the light emitting element to the light receiving element functions as the sensing portion 68A of the optical sensor 68. The optical sensor 68 is mounted on the first frames 25 such that the sensing portion 68A is located within the range of the pivotal movement of the detector 54. In the present embodiment, when the roller holder 274 is in the sixth posture, and the recording sheet 19 is not present in the second conveying path 33, the distal end portion 54A of the detector 54 (as one example of a sensed portion) enters into the sensing portion 68A to intercept the light path (see FIGS. 16 and 17A). In this case, the sensor signal of the LOW level is outputted from the optical sensor 68. When the sensor signal of the LOW level has been outputted, the controller 200 judges that the distal end portion 54A has entered in the sensing portion 68A. It is noted that the posture of the detector 54 (shown in FIGS. 16 and 17A) in which the distal end portion 54A has entered in the sensing portion 68A corresponds to a third posture. As shown in FIG. 17B, when the disc tray 48 is guided through the conveying path 31 to push down the rotator 67 rearward, the detector 54 is pivoted rearward, so that the distal end portion 54A thereof is retracted from the light path of the sensing portion 68A. Further, as shown in FIGS. 18A1-18B4, also when the recording sheet 19 is guided through the conveying path 31 to push down the rotator 67 frontward, the detector 54 is pivoted rearward, so that the distal end portion 54A thereof is retracted from the light path of the sensing portion 68A. In this movement, the signal level of the optical sensor 68 is changed from the LOW level to the HIGH level. When the sensor signal has been changed from the LOW level to the HIGH level, the controller 200 judges that the distal end portion 54A has been retracted from the light path of the sensing portion 68A. It is noted that the posture of the detector 54 in which the distal end portion 54A has been retracted from the sensing portion 68A is a fourth posture.

As shown in FIG. 14, the optical sensor 68 of the second embodiment is disposed on a left side of the left first frame 25 in the rightward and leftward direction 9. That is, the optical sensor 68 is not disposed at an inside area interposed between the pair of the first frame 25, but disposed at an outside area located outside the pair of the first frames 25 in the rightward and leftward direction 9. Like the optical sensor 68 of the first embodiment, the optical sensor 68 of the second embodiment is secured to the left first frame 25 from a left side thereof. That is, as shown in FIG. 9, the optical sensor 68 of the second embodiment is fixed to the sensor holder 92 that is fixed to an outer face of the first frame 25. Specifically, as shown in FIG. 9, the sensor holder 92 for holding the optical sensor 68 of the second embodiment on the first frame 25 includes the mount face 92A and the projections 93 that are provided on the mount face 92 to be mounted on the outer face 98 of the first frame 25, and the projections 93 are fitted into the respective mount holes 94 of the first frame 25, thereby securing the sensor holder 92 to the outer face 98 of the first frame 25. Further, the sensor holder 92 is also fixed to an end portion of the rail 66 in the rightward and leftward direction 9 in FIG. 6, that is, the sensor holder 92 is also fixed to the lower face of the rail 66 at a position outside the area interposed between the first frames 25 in the rightward and leftward direction 9. Specifically, the engaging pieces 95 provided on the upper portion of the sensor holder 92 are engaged with the mount holes 96 formed in the end portion of the rail 66, whereby the sensor holder 92 is fixed to the rail 66. As a result, the optical sensor 68 fixed to the sensor holder 92 is reliably fixed to the outer face of the first frame 25 and the end portion of the rail.

<Sensor Arm 294>

As shown in FIG. 13, the sensor arm 294 has an arm shape elongated in the frontward and rearward direction 8. This sensor arm 294 is provided on an upstream side of the convey-roller pair 35 and on an upper side of the rotator 67. The sensor arm 294 includes: a support shaft 294A extending in the rightward and leftward direction 9; a first arm 294B extending rearward from the support shaft 294A; and the second arm 294C extending rearward from the first arm 294B. The support shaft 294A is supported by a frame, not shown, allowing the sensor arm 294 to be pivoted about the support shaft 294A. This sensor arm 294 is pivotable between (i) an upper posture (indicated by solid lines in FIG. 13) in which the sensor arm 294 is located on an upper side of the rotator 67 so as not to contact the rotator 67 and (ii) a lower posture (indicated by broken lines in FIG. 13) in which the sensor arm 294 can be brought into contact with the rotator 67 to pivot the rotator 67 frontward from the fifth posture to the fifth posture.

The coil spring 298 is provided on an upper side of the first arm 294B. The coil spring 298 is secured at one end thereof to a frame, for example, and is secured at the other end thereof to an upper face of the first arm 294B. When the sensor arm 294 is in the upper posture, the coil spring 298 urges the first arm 294B downward at a predetermined elastic force. The elastic force of the coil spring 298 is a force enough to pivot the rotator 67 frontward.

In the present embodiment, in a process in which the cover 224 is pivoted from the second posture to the first posture, the pressing portion 229 is brought into contact with the second arm 294C to apply a force for pressing the second arm 294C upward. As a result, the second arm 294C is lifted against an urging force of the coil spring 298. That is, the sensor arm 294 is pivoted about the support shaft 294A in a counterclockwise direction in FIG. 13 to take the upper posture. Accordingly, as long as the cover 224 is in the first posture, the sensor arm 294 is kept in the upper posture and does not act on the rotator 67. On the other hand, when the cover 224 has been pivoted from the first posture to the second posture, the pressing portion 229 is moved away from the second arm 294C. As a result, by receiving the urging force of the coil spring 298, the sensor arm 294 is pivoted about the support shaft 294A in a clockwise direction in FIG. 13 to take the lower posture. When the sensor arm 294 has been pivoted to the lower posture, the first arm 294B is brought into contact with the rotator 67 to pivot the rotator 67 frontward from its fifth posture. In this movement, the signal level of the optical sensor 68 is changed from the HIGH level to the LOW level. That is, when the cover 224 is in the first posture, the optical sensor 68 outputs the signal of the HIGH level.

<Cam Driving Mechanism 88>

By receiving the drive power from the sheet-supply motor 112, the cam driving mechanism 88 moves or changes the roller holder 274 between the above-described sixth posture and seventh posture. As shown in FIG. 15, this cam driving mechanism 88 mainly includes bearings 89, a cam shaft 90, two cams 91, shaft guides 75, and a linkage member 292. The bearings 89 are integrally provided on the front end portion of the roller holder 274. Each of the bearings 89 is an annular member having a ring that is larger than an outside diameter of the cam shaft 90. The shaft guides 75 are provided on the respective opposite ends of the sub-frame 26 provided under the roller holder 274. Each of the shaft guides 75 stands upright from an upper face of the sub-frame 26. Each shaft guide 75 supports the cam shaft 90 rotatably and supports the cam shaft 90 movably in the upward and downward direction 7, and each shaft guide 75 includes a vertically long guide groove 75A and a cam receiving portion 75B projected leftward from an upper end of a corresponding one of the shaft guides 75 to a position over a corresponding one of the cams 91. The cam shaft 90 is inserted at its opposite end portions through the guide grooves 75A of the respective shaft guides 75 of the sub-frame 26 in a state in which the cam shaft 90 is inserted through rings of the respective bearings 89. As a result, the cam shaft 90 is supported movably along the guide groove 75A in the upward and downward direction 7. The cams 91 are fixed to the cam shaft 90. Each cam 91 is fixed to the cam shaft 90 so as to be located on a lower side of the cam receiving portion 75B of the corresponding shaft guide 75. The linkage member 292 is a member for receiving the drive power from the sheet-supply motor 112 and is fixed to a right end portion of the cam shaft 90.

When the linkage member 292 is in a posture shown in FIG. 15, the cams 91 are in a free state from the cam shaft 90, i.e., a state in which no drive power is transmitted from the cam shaft 90 to the cams 91. In this state, the cam shaft 90 is supported by lower portions of the bearings 89. The roller holder 274 is kept in its sixth posture in which the pressing rollers 35B are held in pressing contact with the conveying roller 35A by the upward urging force of the springs 78. On the other hand, when the drive power of the sheet-supply motor 112 has been inputted to the linkage member 292, and the cam shaft 90 has been pivoted, the cams 91 are also pivoted. When the pivotal movement of the cams 91 has caused its outer edge portions to be brought into contact with the respective cam receiving portions 75B, the cam shaft 90 is pressed downward, which lowers the cam shaft 90. When the cam shaft 90 has been lowered, the cam shaft 90 pulls the front end portion of the roller holder 274 downward together with the bearings 89 against the urging force of the springs 78, thereby changing the roller holder 274 to the seventh posture. As a result, the pressing rollers 35B are moved away from the conveying roller 35A. In the present embodiment, a distance of the movement of the roller holder 274 is set so as to become generally equal to the thickness of the disc tray 48 (3 mm, for example). It is noted that a posture changing mechanism of the present invention is constituted by the cam driving mechanism 88 and the springs 78, for example.

Figure 20:
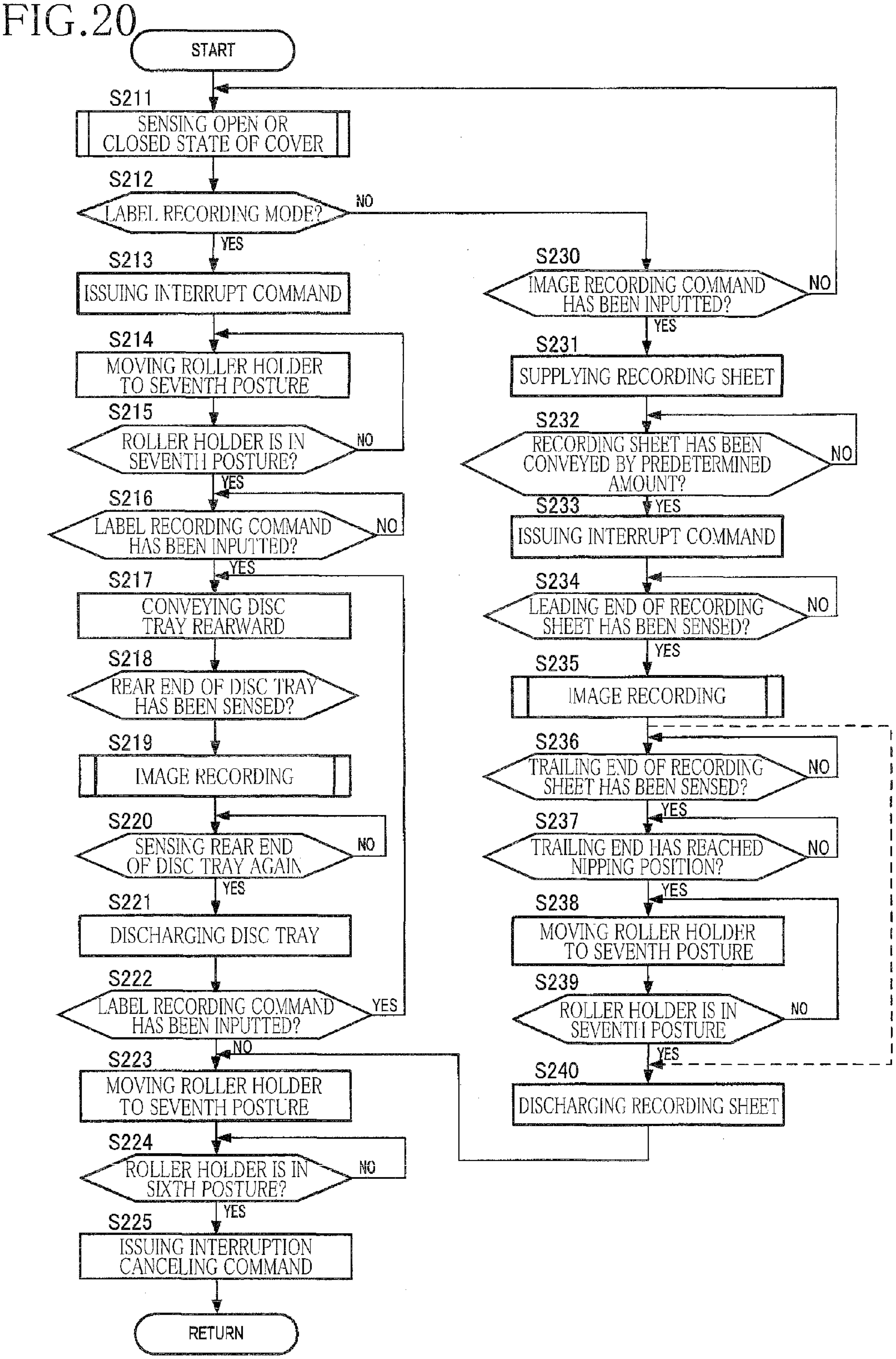
FIG. 20 is a flow-chart showing a procedure of an interrupt processing performed by a CPU 201 when the image recording is performed.

There will be next explained, with reference to FIGS. 10A, 10B, 17, and 18, (a) a procedure of an interrupt processing shown in flow-chart in FIG. 20 executed by a CPU 201 and (b) operations of the members of the MFP 210. FIG. 17A is a cross-sectional view showing a state in which the recording medium is not present, FIG. 17B is a cross-sectional view showing a state when the disc tray 48 has been inserted, and FIG. 17C is a cross-sectional view showing a state in which the disc tray 48 has pressed down the rotator 67. In each of FIGS. 17A-17C, an illustration on a left side is a cross-sectional view showing the operation of the detector 54, and an illustration on a right side is a cross-sectional view showing the operation of the roller holder 274. FIGS. 18A1-18A3 are cross-sectional views showing states of the rotator 67 and other components when what is called a plain paper sheet is conveyed, and FIGS. 18B1-18B4 are cross-sectional views showing states of the rotator 67 and other components when what is called a thick paper sheet is conveyed.

The interrupt processing explained below is a processing for sensing, on the basis of the output signals from the single sensor 68, (a) the open or closed state of the cover 224, (b) the posture of the roller holder 274, (c) the conveyed positions of the recording sheet 19 and the disc tray 48, and so on.

Where the MFP 210 is in a standby state in which the MFP 210 can receive the image recording command, the roller holder 274 is in the sixth posture, and the cover 224 is in the first posture (i.e., the closed posture). Where the MFP 210 is in the standby state, the CPU 201 in S211 executes a processing (a cover-posture sensing processing) for sensing the open or closed state of the cover 224 on the basis of the signal sent from the sensor 68. Specifically, where the signal sent from the sensor 68 is the LOW level, the CPU 201 judges that the cover 224 is in the first posture (the closed posture), and where the signal sent from the sensor 68 is the HIGH level, the CPU 201 judges that the cover 224 is in the second posture (the open posture). Where the CPU 201 has judged that the cover 224 is in the second posture, the CPU 201 outputs error information indicating that the cover 224 is open, to the LCD 16A and/or an external device such as the PC. It is noted that, during executing the cover-posture sensing processing in S211, the CPU 201 does not execute the processing for sensing the posture of the roller holder 274, or the processing for sensing the conveyed positions of the disc tray 48 or the recording sheet 19.

Then in S212, the CPU 201 judges whether the recording mode is the label recording mode or not. When the tray guide 45 has been pulled out frontward by the user and is ready for the label recording, the detector, not shown, is retracted from the sensing portion of the optical sensor 118, whereby the level of the output signal of the optical sensor 118 is changed from the LOW level to the HIGH level. The CPU 201 judges that the tray guide 45 has been pulled out on the basis of this change and then changes the recording mode to the label recording mode.

When the tray guide 45 has been pulled out frontward by the user, and the linkage plates 50 are changed from the initial posture to the expanded posture, the platen 22, the discharging rollers 36B, and the switch-back rollers 37B are lowered, causing the second conveying path 33 to be expanded in the upward and downward direction 7. It is noted that the expanded posture of the linkage plates 50 is the posture for the image recording on the disc medium such as a CD and a DVD.

In S211, where the CPU 201 has judged that the recording mode is the label recording mode, the CPU 201 issues an interrupt command in S213. This interrupt command is for interrupting the cover-posture sensing processing to execute another sensing processing using the signal sent from the sensor 68. That is, after the interrupt command has been outputted, the open or closed state of the cover 224 is not sensed. After the interrupt command has been outputted, the CPU 201 in S214 executes a processing for moving the roller holder 274 to the seventh posture in order to move the pressing rollers 35B away from the conveying roller 35A. Specifically, the path through which the drive power is transmitted from the sheet-supply motor 112 is changed from a path to the sheet-supply roller 41, to a path to the cam driving mechanism 88, and then the CPU 201 drives the sheet-supply motor 112 by a predetermined rotational amount. As a result, the drive power of the sheet-supply motor 112 is transmitted to the roller holder 274 via the cam driving mechanism 88, whereby the roller holder 274 is moved from the sixth posture to the seventh posture. As a result, the conveying roller 35A is moved away from the pressing rollers 35B. It is noted that one specific example of switching the transmitting path is using a movable member such as the carriage 23 to change a position of a switching lever provided on the switching gear 114.

Then in S215, the CPU 201 judges on the basis of the output signal of the optical sensor 68 whether the roller holder 274 is in the seventh posture or not. When the roller holder 274 has moved to the seventh posture, the rotator 67 is inclined frontward as described above, whereby the detector 54 is retracted frontward from the sensing portion 68A (see FIG. 17B). In this movement, the level of the output signal of the optical sensor 68 is changed from the LOW level to the HIGH level. Where the recording mode is in the label recording mode and where the output signal of the optical sensor 68 has changed from the LOW level to the HIGH level, the CPU 201 judges that the roller holder 274 is in the seventh posture.

It is noted that, where the CPU 201 has judged in S215 that the roller holder 274 is not in the seventh posture, the CPU 201 repeats the processings of S214 and S215. Where although these processings have been repeated a predetermined number of times, the CPU 201 has judged that the roller holder 274 is not in the seventh posture nevertheless, the CPU 201 displays, on the LCD 16A or the PC, an error message indicating a malfunction of the roller holder 274, and then suspends this label recording processing.

Where the CPU 201 has judged that the roller holder 274 is in the seventh posture (S215: YES), the CPU 201 judges in S216 whether or not the label recording command has been inputted from the operation panel 16, the PC, or the like. Where the CPU 201 has judged that the label recording command has been inputted (S216: YES), the CPU 201 in S217 executes the processing for conveying the disc tray 48 rearward. After the second conveying path 33 has been expanded in the upward and downward direction 7, the user inserts the disc tray 48 into the second conveying path 33 from the opening 17 in the state in which the disc tray 48 is supported by the tray guide 45. The user inputs the label recording command after the disc tray 48 has been inserted to a position shown in FIGS. 17B and 10A. Where the label recording command has been inputted by the user, the CPU 201 controls the conveyance motor 113 to rotate the conveying roller 35A and the discharging rollers 36B reversely. As a result, the disc tray 48 is conveyed rearward.

Figure 17C:
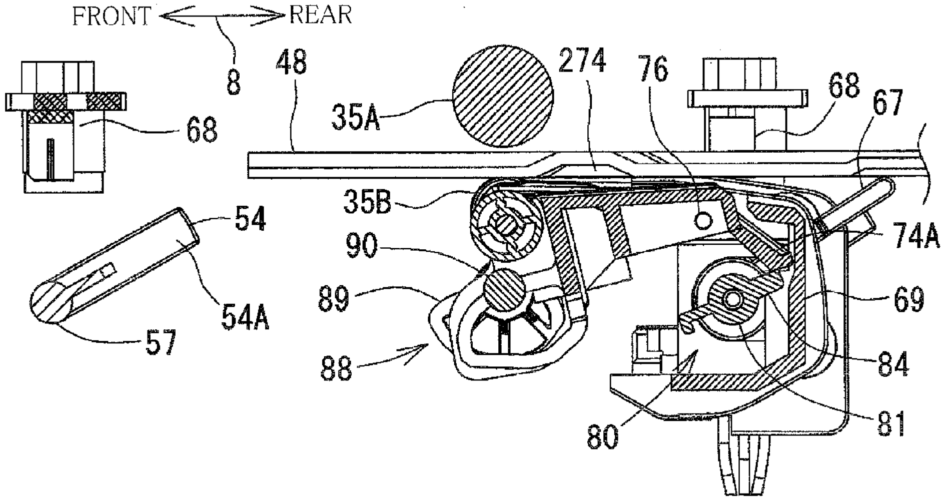

As shown in FIGS. 17C and 10B, when the disc tray 48 has been conveyed rearward, the rear end portion of the disc tray 48 pushes down rearward the rotator 67 being inclined frontward. Thus, the detector 54 retracted frontward from the sensing portion 68A enters into the sensing portion 68A and then exits rearward. In this movement, the level of the output signal of the optical sensor 68 is changed from the HIGH level to the LOW level and immediately thereafter changed to the HIGH level again. Where the label recording command has been inputted and where the signal level of the optical sensor has been changed from the HIGH level to the LOW level, the CPU 201 in S218 senses that the rear end portion of the disc fray 48 has passed through the rotator 67.

Where the CPU 201 has sensed the rear end portion of the disc tray 48 (S218: YES), the CPU 201 in S219 conveys the disc tray 48 to a position at which an image is recorded on the label face of the disc medium and then performs the image recording on the label face of the disc medium while intermittently conveying the disc tray 48 frontward by rotating the conveying roller 35A forwardly.

In the image recording, the CPU 201 in S220 senses the rear end of the disc tray 48 again on the basis of the output signal of the optical sensor 68. When the disc tray 48 has been conveyed frontward, the rear end portion of the disc tray 48 passes through the rotator 67, and the rotator 67 returns to the above-described posture (see FIG. 17B) thereof in which the rotator 67 is inclined frontward. In this operation, the detector 54 retracted rearward from the sensing portion 68A enters into the sensing portion 68A and then exits frontward. In this movement, the level of the output signal of the optical sensor 68 is changed from the HIGH level to the LOW level and immediately thereafter changed to the HIGH level again. When the signal level of the optical sensor has been changed from the HIGH level to the LOW level again during the image recording, the CPU 201 senses that the rear end portion of the disc tray 48 has passed through the rotator 67 again. In S221, when the image recording processing has been finished, the conveying roller 35A and so on are continuously rotated to discharge the disc tray 48 frontward.

Where the label recording command has been inputted again (S222: YES), the CPU 201 repeats the processings of S217 through S221. On the other hand, where the label recording command has not been inputted, and the tray guide 45 has been pressed rearward by the user, the level of the output signal of the optical sensor 118 is changed from the HIGH level to the LOW level. On the basis of this change, the CPU 201 judges that the label recording mode is finished, and then changes the recording mode to the normal recording mode. At this time, the CPU 201 drives the sheet-supply motor 112 by a predetermined amount to bring the pressing rollers 35B into pressing contact with the conveying roller 35A, and then in S223 returns the roller holder 274 from the seventh posture to the sixth posture.

Then in S224, the CPU 201 judges on the basis of the output signal of the optical sensor 68 whether the roller holder 274 is in the sixth posture or not. When the roller holder 274 has returned to the sixth posture, the rotator 67 inclined frontward moves rearward, whereby the detector 54 enters into the sensing portion 68A. In this movement, the level of the output signal of the optical sensor 68 is changed from the HIGH level to the LOW level. On the basis of this change, the CPU 201 judges that the roller holder 274 has returned to the sixth posture. Then in S225, the CPU 201 issues an interruption canceling command. When the interruption canceling command has been issued, the suspended cover-posture sensing processing is restarted, enabling the sensing of the open or closed state of the cover 224.

On the other hand, where the output signal of the optical sensor 118 remains at the HIGH level in S211, the CPU 201 maintains the standby state. In the standby state, the linkage plates 50 are kept in the initial posture. Where the CPU 201 has judged that the image recording command has been inputted together with the image data from the PC, for example (S230: YES), the recording mode is changed to the normal recording mode, and the recording sheet 19 is supplied from the sheet-supply cassette 14 in S231.

Then in S232, the CPU 201 judges whether an amount of the conveyance of the recording sheet 19 has reached a predetermined conveyance amount or not. Here, the predetermined conveyance amount is an amount or distance of the conveyance of the recording sheet until the leading end of the recording sheet 19 reaches a position just before the rotator 67. The CPU 201 calculates an actual conveyance amount on the basis of encoder signals from the sheet-supply roller 41 and the sheet-supply motor 112 and compares the obtained actual conveyance amount with the above-described predetermined conveyance amount to perform the judgment in S232. Here, where the CPU 201 has judged that the conveyance amount of the recording sheet 19 has reached the predetermined conveyance amount, that is, where the CPU 201 has judged that the leading end of the recording sheet 19 has reached the position just before the rotator 67, the CPU 201 issues the above-described interrupt command in S233. That is, the cover-posture sensing processing of S211 is continued without suspension until the interrupt command is issued in S233, and after the interrupt command has been issued in S233, the cover-posture sensing processing is suspended.

After the interrupt command has been issued, the CPU 201 in S234 senses the position of the leading end of the recording sheet 19 in the second conveying path 33 on the basis of the output signal of the optical sensor 68. As shown in FIG. 18A2 or 18B2, when the leading end of the recording sheet 19 has pushed down the rotator 67 during the conveyance of the recording sheet 19, the output signal of the optical sensor 68 is changed from the LOW level to the HIGH level. On the basis of this change of the signal level, the CPU 201 senses that the leading end of the recording sheet 19 has passed through the rotator 67. Where the CPU 201 has sensed the leading end of the recording sheet 19 (S234: YES), the CPU 201 in S235 starts the image recording on the recording sheet 19 after the recording sheet 19 has been conveyed to the position for the image recording. It is noted that when the leading end of the recording sheet 19 has reached the position at which the convey-roller pair 35 can nip and convey the recording sheet 19, the sheet-supply roller 41 stops supplying the recording sheet 19.

Where the recording sheet 19 is a thick paper sheet such as a glossy paper sheet and a postcard, for example, the CPU 201 goes to S236. On the other hand, where the recording sheet 19 is a thin paper sheet such as what is called a plain paper sheet, the CPU 201 goes to S240 after the image recording has been completed. In S240, the recording sheet 19 is discharged, and the CPU 201 goes to S223.

There will be hereinafter explained processings in the case where the recording sheet 19 is the thick paper sheet. Where the image recording is performed on the thick paper sheet having a thickness equal to or greater than a certain thickness, the following phenomenon occurs when a trailing end of the recording sheet has passed through the nipping position of the convey-roller pair 35. That is, the thick recording sheet tends to be conveyed by an excessive amount, resulting in appearance of a widthwise white line on a recorded surface of the sheet. Such a white line may deteriorate an image quality. In order to solve this problem, where the image recording is performed on the thick paper sheet, when the trailing end of the sheet has reached the nipping position, the rollers of the convey-roller pair 35 needs to be moved away from each other to prevent the above-described excessive conveyance. Thus, the CPU 201 in S236 senses a position of the trailing end of the recording sheet 19. When the trailing end of the recording sheet 19 has passed through the rotator 67 during the conveyance of the recording sheet 19, the rotator 67 returns to its original position, and accordingly the detector 54 is pivoted to enter into the sensing portion 68A of the optical sensor 68 again (see FIG. 18B3). In this operations, the output signal of the optical sensor 68 is changed from the HIGH level to the LOW level. On the basis of this change, the CPU 201 in S236 senses that the trailing end of the recording sheet 19 has passed through the rotator 67.

When the trailing end of the recording sheet 19 has been sensed, the CPU 201 in S237 judges whether the trailing end of the recording sheet 19 has reached the nipping position of the convey-roller pair 35 or not. Specifically, the CPU 201 calculates a conveyance amount of the recording sheet 19 after the trailing end has been sensed on the basis of the signal from the conveying roller 35A or the encoder 116 mounted on the conveyance motor 113, and compares the obtained value with a distance from the rotator 67 to the nipping position. Where the obtained value is the same as the distance to the nipping position, the CPU 201 judges that the trailing end of the recording sheet 19 has reached the nipping position of the convey-roller pair 35.

Where the CPU 201 has judged that the trailing end of the recording sheet 19 has reached the nipping position of the convey-roller pair 35 (S237: YES), the CPU 201 in S238 performs a processing for moving the roller holder 274 to the seventh posture as in S214. Then in S239, the CPU 201 judges whether the roller holder 274 is in the seventh posture or not on the basis of the output signal of the optical sensor 68 as in S215.

It is noted that, where the CPU 201 has judged in S239 that the roller holder 274 is not in the seventh posture, the CPU 201 repeats the processings of S238 and S239 again. Where although these processings have been repeated a predetermined number of times, the CPU 201 has judged that the roller holder 274 is not in the seventh posture nevertheless, the CPU 201 displays, on the LCD 16A or the PC, the error message indicating the malfunction of the roller holder 274 and then suspends or continues the image recording processing. After the image recording has been completed, the recording sheet 19 is discharged in S240, and the CPU 201 goes to S223.

In view of the above, the CPU 201 can be considered to include a first detecting section configured to detect the posture of the cover 224 on the basis of the output from the optical sensor 68 where a conveyance distance in which the recording sheet 19 has been conveyed from the sheet-supply cassette 14 is less than a length of a path extending from the sheet-supply cassette 14 to the rotator 67, and this first detecting section can be considered to perform the processing in S211. Further, the CPU 201 can be considered to include a second detecting section configured to detect the conveyed position of the recording sheet 19 on the basis of the output from the optical sensor 68 where the conveyance distance is equal to or greater than the length of the path extending from the sheet-supply cassette 14 to the rotator 67, and this second detecting section can be considered to perform the processing in S234. Further, the CPU 201 can be considered to include a third detecting section configured to detect the posture of the roller holder 274 on the basis of the output from the optical sensor 68 where the second detecting section has detected that the conveyed position of the recording sheet 19 is a position located on a downstream side of the rotator 67 in the first conveyance direction in the conveying path, and this third detecting section can be considered to perform the processing in S239.

Further, the CPU 201 can be considered to include a posture controller configured to control the drive source to drive the cam driving mechanism 88 so as to change the roller holder 274 from the sixth posture to the seventh posture, where the second detecting section has detected that the conveyed position of the recording sheet 19 is a position located on a downstream side of the rotator 67 in the first conveyance direction in the conveying path, and this posture controller can be considered to perform the processing in S238. Further, the CPU 201 can be considered to include a fourth detecting section configured to detect the posture of the roller holder 274 on the basis of the output from the optical sensor 68 where the posture controller has controlled the drive source, and this fourth detecting section can be considered to perform the processing in S239.

<Effects of Second Embodiment>

By executing the interrupt processing as described above, it is possible to sense the open or closed state of the cover 224, the posture of the roller holder 274, the conveyed positions of the recording sheet 19 and the disc tray 48 in the conveying path 31 on the basis of the change of the level of the output signal from the single sensor 68. This eliminates a need to provide optical sensors for a plurality of objects to be sensed, leading to a reduction in the number of the sensors to be provided. Accordingly, it is possible to prevent increase in size of the apparatus and increased cost due to increases in the number of components and the number of manufacturing steps.

It is noted that, in the present second embodiment, the optical sensor 68 is used as one example of the sensor, but instead of the optical sensor 68, there may be employed another type of sensor such as a reflective sensor, a magnetic sensor, and a contact sensor. In the above-described embodiment, the sheet-supply motor 112 is commonly used as the drive source of the roller holder 274, but an independent drive source such as a solenoid and a motor may be used without commonly using the sheet-supply motor 112. In this case, the roller holder 274 is moved without switching the drive-power transmitting paths.

Further, in the second embodiment, the sensor arm 294 is retracted upward from the optical sensor 68, but the sensor arm 294 may be configured to be retracted to a position under the optical sensor 68.

Further, in the second embodiment, the open or closed state of the cover 224, the posture of the roller holder 274, and the conveyed positions of the recording sheet 19 and the disc tray 48 are sensed on the basis of the output signals of the sensor 68, but the present invention may be applied to a construction in which only two objects, i.e., the open or closed state of the cover 224 and the posture of the roller holder 274 are sensed on the basis of the output signals of the sensor 68. The present invention may also be applied to a construction in which only the open or closed state of the cover 224 and the conveyed positions of the recording sheet 19 and the disc tray 48 are sensed on the basis of the output signals of the sensor 68.

What is claimed is:

1. An image recording apparatus comprising:
a main frame comprising:
a pair of side plates facing each other in one direction; and
a base plate comprising opposite end portions in the one direction, wherein the opposite end portions are respectively supported by the pair of side plates, and the one direction is perpendicular to a first conveyance direction of a recording medium;
a guide member provided at an inside area that is interposed between the pair of side plates in the one direction, the guide member defining a conveying path through which the recording medium is conveyed; and
a sensor device comprising:
a sensing portion supported by one of the pair of side plates; and
a detector configured to be moved by the recording medium conveyed through the conveying path,
wherein the sensing portion is configured to sense a movement of the detector.

2. The image recording apparatus according to claim 1, further comprising:
a support member supported at one of outside areas respectively located outside the pair of side plates in the one direction;
wherein the sensing portion is supported by the one of the pair of side plates via the support member.

3. The image recording apparatus according to claim 2, further comprising:
a recording portion configured to record an image on the recording medium; and
a support plate supported by upper end portions of the pair of side plates and supporting the recording portion such that the recording portion is movable from the inside area to the outside areas,
wherein the support member is also fixed to a portion of the support plate which portion is located at one of the outside areas.

4. The image recording apparatus according to claim 1, further comprising:
a support shaft supported so as to be rotatable about an axis parallel to the one direction,
wherein the detector comprises:
a first detector fixed to the support shaft so as to project into the conveying path; and
a second detector fixed to one of the opposite end portions which is nearer to the sensing portion than the other, the second detector being movable so as to pass through a sensing area of the sensing portion.

5. The image recording apparatus according to claim 4,
wherein the support shaft is disposed on a side of the guide member which is opposite to a side thereof on which a guide face of the guide member for guiding the recording medium is located, and
wherein the first detector projects into the conveying path at a central portion of the guide member in the one direction from the side of the guide member which is opposite to the side thereof on which the guide face is located.

6. The image recording apparatus according to claim 4, wherein the support shaft extends such that the one of the opposite end portions thereof which is nearer to the sensing portion is located at an outside area that is located outside the pair of side plates in the one direction, and wherein the second detector is fixed to a portion of the support shaft, which portion is located at the outside area.

7. The image recording apparatus according to claim 4, further comprising:

a recording portion configured to record an image on the recording medium conveyed through the conveying path in the first conveyance direction; and a cover whose posture is changeable between:

a first posture in which the cover covers the conveying path from an outside thereof, and a second posture in which the conveying path is visually recognizable from an outside of the image recording apparatus, wherein the second detector has a sensed portion to be sensed by the sensing portion, a posture of the sensed portion being changeable between:

a third posture in which the sensed portion is located in the sensing area of the sensing portion, and a fourth posture in which the sensed portion is retracted from the sensing area of the sensing portion, wherein the first detector is a detector whose posture is changed with the change of the posture of the second detector and which takes a fifth posture when the second detector is in the third posture, the first detector protruding into the conveying path in the fifth posture, and wherein the image recording apparatus further comprises:

a first linkage mechanism configured to change the first detector from the fifth posture with the change of the posture of the cover from the first posture to the second posture; and a detecting portion configured to detect a conveyed position of the recording medium in the conveying path and the posture of the cover on the basis of output from the sensing portion.

8. The image recording apparatus according to claim 7, further comprising a convey-roller pair provided on an upstream side of a portion of the conveying path in the first conveyance direction, the portion facing the recording portion, wherein the convey-roller pair is constituted by a drive roller and a driven roller arranged so as to face each other with the conveying path interposed therebetween in a state in which the drive roller and the driven roller are contactable with each other, wherein the cover is provided on an upstream side of the convey-roller pair in the first conveyance direction so as to define a portion of the conveying path from an outside thereof, wherein the first detector is disposed so as to project into the conveying path at a position between the convey-roller pair and the portion of the conveying path which is defined by the cover, and wherein the detecting portion includes:

a first detecting section configured to detect the posture of the cover on the basis of the output from the sensing portion when a conveyance distance in which the recording medium has been conveyed from a supply source is less than a length of a path extending from the supply source to the first detector; and a second detecting section configured to detect the conveyed position of the recording medium on the basis of the output from the sensing portion when the conveyance distance is equal to or greater than the length of the path extending from the supply source to the first detector.

9. The image recording apparatus according to claim 7, further comprising:

a convey-roller pair provided on an upstream side of a portion of the conveying path in the first conveyance direction, the portion facing the recording portion, and the convey-roller pair being constituted by a drive roller and a driven roller arranged so as to face each other with the conveying path interposed therebetween in a state in which the drive roller and the driven roller are contactable with each other;

a driven-roller support member which supports a shaft of the driven roller and whose posture is changeable between:

a sixth posture in which the driven roller is held in contact with the drive roller, and a seventh posture in which the driven roller is distant from the drive roller;

a posture changing mechanism configured to change the driven-roller support member between the sixth posture and the seventh posture by a drive power from a drive source; and a second linkage mechanism configured to change the first detector from the fifth posture to a posture different therefrom with the change of the posture of the driven-roller support member from the sixth posture to the seventh posture by the posture changing mechanism, wherein the detecting portion is configured to further detect the posture of the driven-roller support member on the basis of the output from the sensing portion.

10. The image recording apparatus according to claim 9, wherein the cover is provided on an upstream side of the convey-roller pair in the first conveyance direction, wherein the first detector is disposed so as to project into the conveying path at a position between the convey-roller pair and a portion of the conveying path which is defined by the cover;

wherein the detecting portion includes:

a first detecting section configured to detect the posture of the cover on the basis of the output from the sensing portion when a conveyance distance in which the recording medium has been conveyed from a supply source is less than a length of a path extending from the supply source to the first detector;

a second detecting section configured to detect the conveyed position of the recording medium on the basis of the output from the sensing portion when the conveyance distance is equal to or greater than the length of the path extending from the supply source to the first detector; and a third detecting section configured to detect the posture of the driven-roller support member on the basis of the output from the sensing portion when the second detecting section has detected that the conveyed position of the recording medium is a position located on a downstream side of the first detector in the first conveyance direction in the conveying path.

11. The image recording apparatus according to claim 10, further comprising a posture controller configured to control the drive source to drive the posture changing mechanism such that the posture changing mechanism changes the driven-roller support member from the sixth posture to the seventh posture, where the second detecting section has detected that the conveyed position of the recording medium is a position located on a downstream side of the first detector in the first conveyance direction in the conveying path, wherein the detecting portion further includes a fourth detecting section configured to detect the posture of the driven-roller support member on the basis of the output from the sensing portion where the posture controller has controlled the drive source.

12. The image recording apparatus according to claim 11, wherein the second detecting section is configured to further detect whether a trailing end of the recording medium is located at a nipping point of the convey-roller pair in the conveying path or not on the basis of the output from the sensing portion, and wherein, where the second detecting section has detected that the trailing end of the recording medium is located at the nipping point, the posture controller controls the drive source to drive the posture changing mechanism such that the posture changing mechanism changes the driven-roller support member from the sixth posture to the seventh posture.

13. The image recording apparatus according to claim 1, further comprising:

a recording portion configured to record an image on the recording medium; and a tray disposed on a lower side of the recording portion so as to accommodate the recording medium, wherein the conveying path includes a first path extending upward from one end of the tray, and wherein the guide member defines the first path from an inside thereof.

14. The image recording apparatus according to claim 13, wherein the conveying path further includes:

a straight second path extending from a terminal end of the first path to the recording portion; and a third path extending from a branch point provided on the second path, through an area between the second path and the tray so as to be connected to a meeting point provided midway on the first path, and wherein the guide member defines a portion of the first path from an inside thereof, the portion extending from the meeting point toward the terminal end of the first path.

15. The image recording apparatus according to claim 1, wherein the main frame includes a sub-plate provided on an upper side of the base plate and supported at opposite end portions thereof in the one direction respectively by the pair of side plates, and wherein an end portion of the guide member is fixed to the sub-plate, the end portion being disposed on a side of the guide member which is opposite to a side thereof on which a guide face of the guide member for guiding the recording medium is located.

* * * * *